United States Patent
Ueda et al.

(10) Patent No.: US 8,614,827 B2
(45) Date of Patent: Dec. 24, 2013

(54) IMAGE PROCESSING METHOD

(75) Inventors: Masashi Ueda, Nagoya (JP); Seiji Yoshida, Mizuho (JP); Ryuji Yamada, Oogaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1595 days.

(21) Appl. No.: 10/950,603

(22) Filed: Sep. 28, 2004

(65) Prior Publication Data

US 2005/0111018 A1 May 26, 2005

(30) Foreign Application Priority Data

Sep. 30, 2003 (JP) .................................. 2003-342602

(51) Int. Cl.
*G06F 15/00* (2006.01)

(52) U.S. Cl.
USPC ........... 358/1.9; 358/515; 358/1.15; 382/167; 382/162

(58) Field of Classification Search
USPC ........ 358/518, 3.23, 530, 523–525, 1.13, 1.1, 358/1.14, 1.15, 1.9; 714/47, 39; 340/286.02; 347/17, 101; 370/908
See application file for complete search history.

(56) References Cited

U.S. PATENT DOCUMENTS

| | | | |
|---|---|---|---|
| 6,243,542 B1 | 6/2001 | Fujimoto et al. | |
| 6,384,934 B1 * | 5/2002 | Kohtani et al. | 358/1.9 |
| 7,034,862 B1 * | 4/2006 | Cirulli et al. | 348/96 |
| 2001/0009464 A1 * | 7/2001 | Kuno et al. | 358/1.9 |
| 2002/0039189 A1 * | 4/2002 | Sato | 358/1.9 |
| 2002/0118889 A1 * | 8/2002 | Shimizu | 382/274 |

FOREIGN PATENT DOCUMENTS

| | | |
|---|---|---|
| JP | A 2000-004362 | 1/2000 |
| JP | A 2000-227684 | 8/2000 |
| JP | A 2000-241913 | 9/2000 |

* cited by examiner

*Primary Examiner* — Twyler Haskins
*Assistant Examiner* — Brendan McCommas
(74) *Attorney, Agent, or Firm* — Oliff & Berridge, PLC

(57) ABSTRACT

An image processing method determines a number of smoothing times $S_{time}$ so that the number of times, at which the corrected tone values will be modified, increases as the amount of modification, by which the corrected tone values are required to be modified, increases; and modifies the corrected tone values by dividing the modification amount by the number of smoothing times $S_{time}$ so that the actual printing characteristics R[i] predicted to be actually obtained approach the ideal characteristics T[i] in steps of the smoothing times $S_{time}$. Therefore, the image processing method can prevent an abrupt change in the characteristics of printed color density levels before and after the corrected tone values are modified, even when the modification amount of the corrected tone values is large.

16 Claims, 15 Drawing Sheets

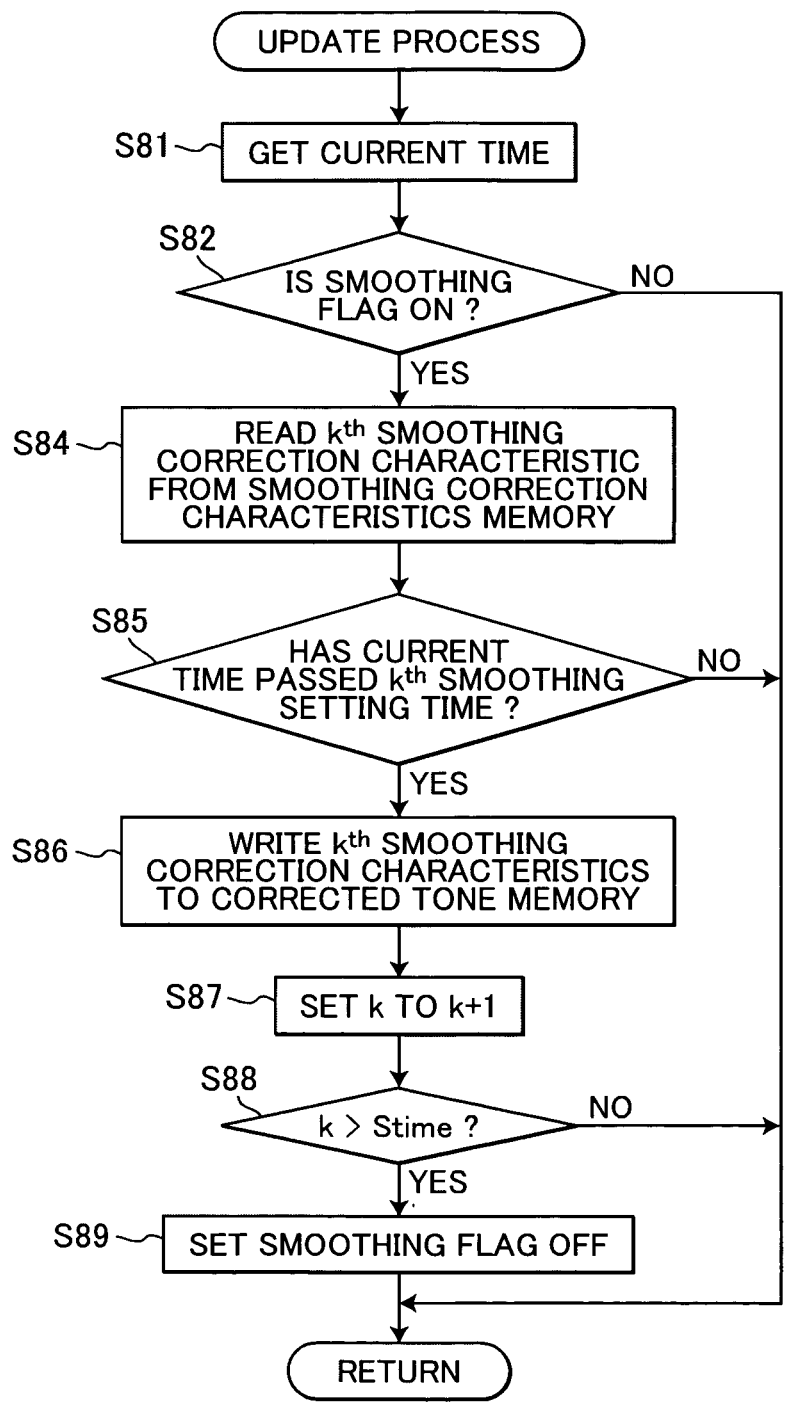

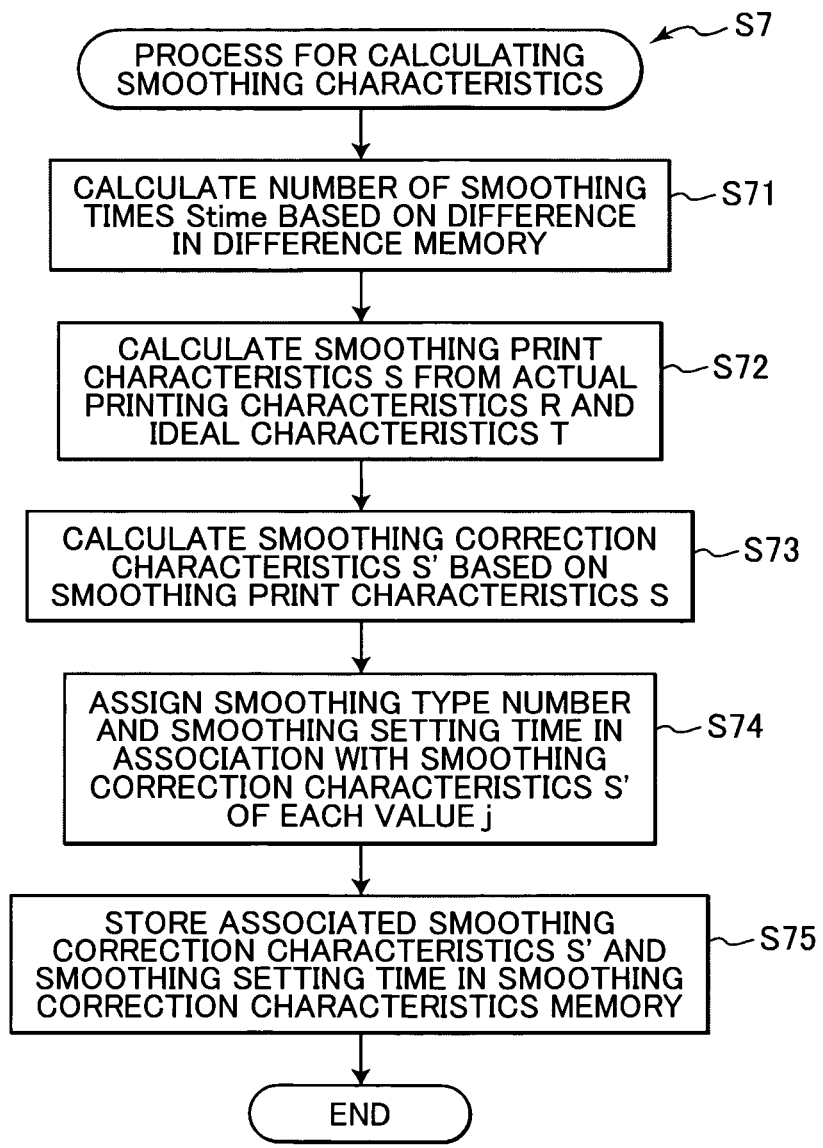

FIG.9

| SMOOTHING TYPE | NO.1 | NO.2 | ..... |
|---|---|---|---|
| SETTING TIME | 13:45 | 14:15 | |
| SMOOTHING CORRECTION CHARACTERISTIC VALUE S'(j)[0] | 0 | 0 | |
| SMOOTHING CORRECTION CHARACTERISTIC VALUE S'(j)[1] | 0 | 1 | |
| SMOOTHING CORRECTION CHARACTERISTIC VALUE S'(j)[2] | 1 | 3 | |
| SMOOTHING CORRECTION CHARACTERISTIC VALUE S'(j)[3] | 2 | 5 | |
| : | | | |
| SMOOTHING CORRECTION CHARACTERISTIC VALUE S'(j)[255] | 255 | 255 | | k = 1 (NO.1), k = 2 (NO.2)

← i = 0 ... ← i = 255

SMOOTHING CORRECTION CHARACTERISTICS S'(j)[0] – S'(j)[255]

SMOOTHING CORRECTION CHARACTERISTICS S'(j)[0] – S'(j)[255]

57f

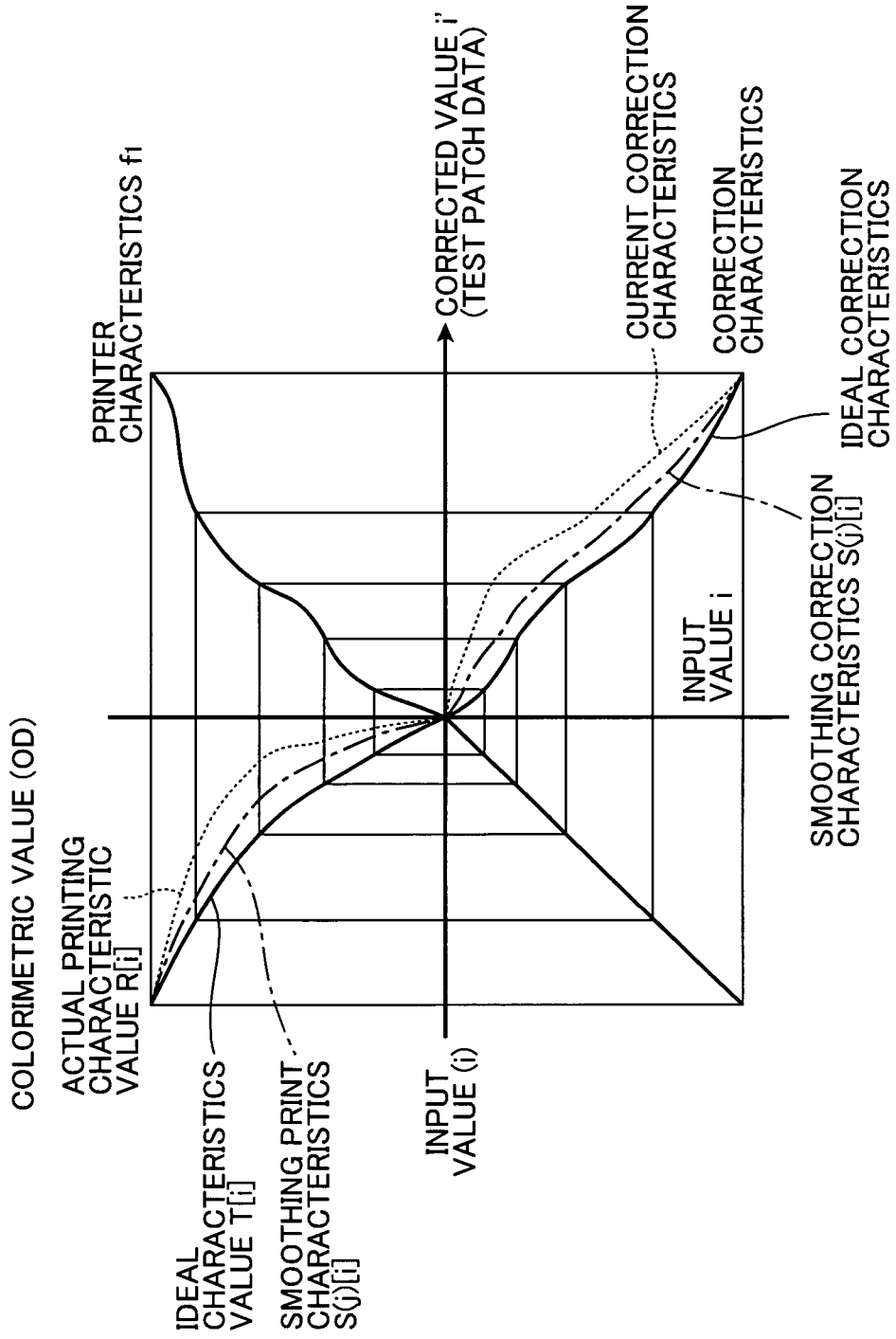

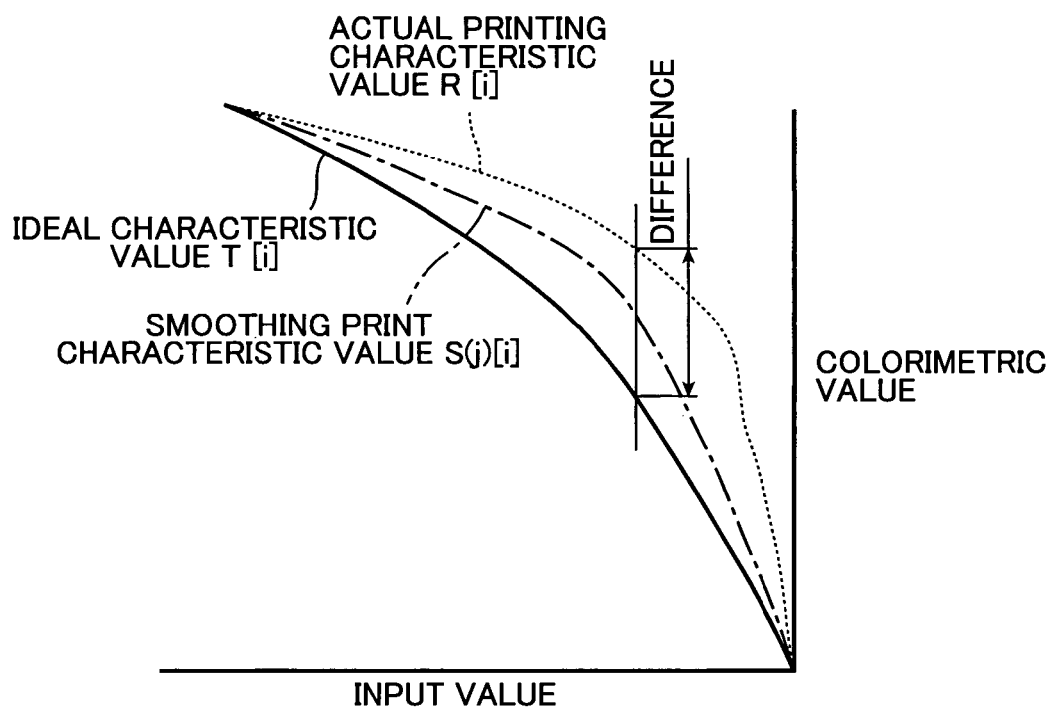

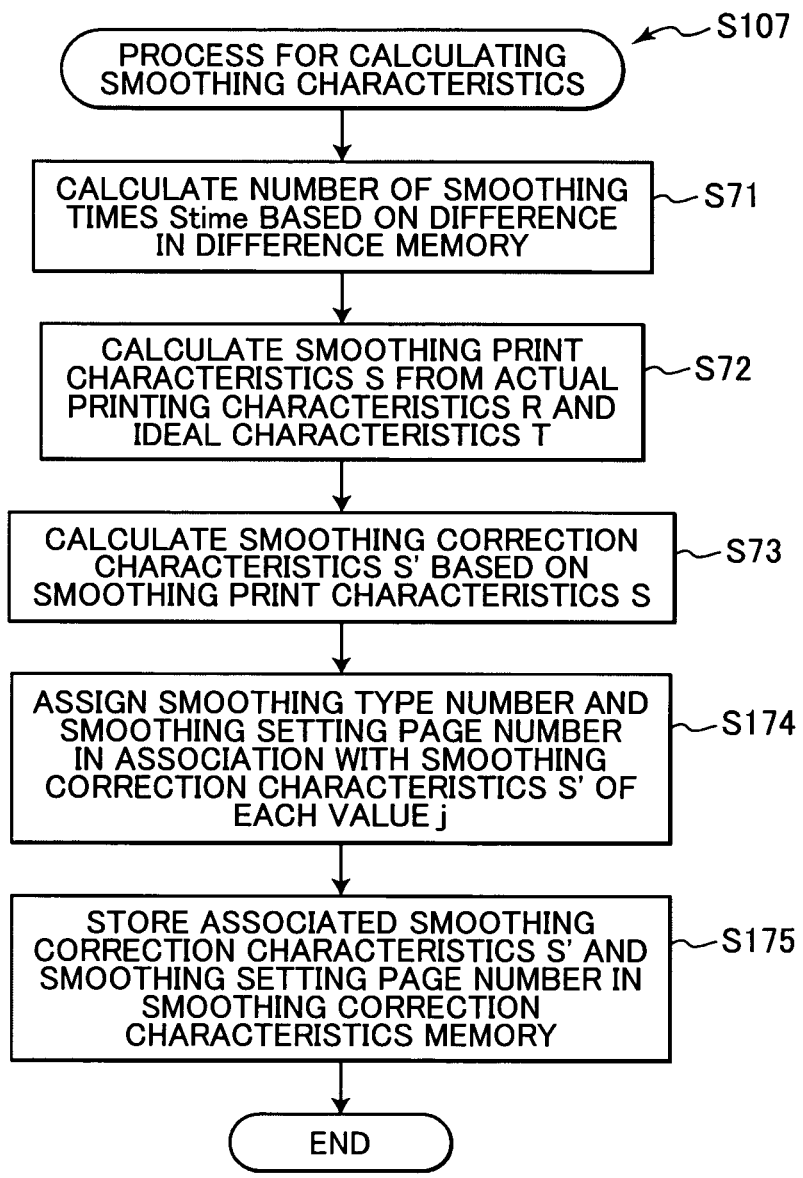

FIG.11(c)

| SMOOTHING TYPE | NO.1 (k=1) | NO.2 (k=2) | ..... |
|---|---|---|---|
| SETTING PAGE NUMBER | 1234 | 1334 | |
| SMOOTHING CORRECTION CHARACTERISTIC VALUE S'(j)[0] | 0 | 0 | | ← i=0
| SMOOTHING CORRECTION CHARACTERISTIC VALUE S'(j)[1] | 0 | 1 | |
| SMOOTHING CORRECTION CHARACTERISTIC VALUE S'(j)[2] | 1 | 3 | |
| SMOOTHING CORRECTION CHARACTERISTIC VALUE S'(j)[3] | 2 | 5 | |
| ⋮ | | | |
| SMOOTHING CORRECTION CHARACTERISTIC VALUE S'(j)[255] | 255 | 255 | | ← i=255

SMOOTHING CORRECTION CHARACTERISTICS S'(j)[0] − S'(j)[255]

SMOOTHING CORRECTION CHARACTERISTICS S'(j)[0] − S'(j)[255]

IMAGE PROCESSING METHOD

BACKGROUND OF THE INVENTION

1. Field of the Invention

The present invention relates to an image processing method and an image processing device.

2. Description of Related Art

In a conventional image processing method such as disclosed by the U.S. Pat. No. 6,243,542, color image data supplied from a digital camera or other input device is inputted into a host device, such as a personal computer. The personal computer then prints out a color document via a printer or other output device based on the color image data.

In this method, data for the three colors red (R), green (G), and blue (B) in the color system of a monitor used by the personal computer is converted to data for the four colors cyan (C), magenta (M), yellow (Y), and black (K) in the color system for ink or toner used by the printer. In order to enhance color reproducibility, the CMYK data is further modified into C'M'Y'K' data through tone correction based on the output characteristics of the printer.

SUMMARY OF THE INVENTION

FIG. 1 is an explanatory diagram illustrating a conceivable color conversion process and tone correction process. RGB image data inputted from a digital camera or other input device is converted to CMYK image data by referencing a three-dimensional look-up table stored in memory. The CMYK values are further converted to C'M'Y'K' values according to tone correction characteristics based on a one-dimensional look-up table. The tone correction characteristics are set according to the characteristics of the printer and indicate a one-to-one correspondence between input tone levels (which will be referred to as "input values" hereinafter) and corrected tone levels (which will be referred to as "corrected tone values" hereinafter). This ensures that the same density level will be always reproduced based on each set of image data independent from individual printer characteristics.

The printer characteristics change over time, in response to environmental changes, when toner cartridges are replaced with new one, and the like. Accordingly, a calibration process is performed to modify the tone correction characteristics (corrected tone values) after the printer is turned on, after the printer prints some printing amount, or at some regular time intervals after the printer is turned on, for example.

According to a conceivable calibration process, test patch data stored on the hard disk of the personal computer or the like is printed out. The densities of the printed test patches are measured using a calorimeter, and the tone correction characteristics (corrected tone values) are modified based on calorimetric values obtained by the calorimeter.

FIG. 2 is an explanatory diagram showing an example of test patches that are printed on a recording paper or the like.

As shown in FIG. 2, ten test patches 100 at intervals of 10% density are printed for each CMYK color, and one 0% density test patch 101 is also printed, making a total of forty-one test patches. Tone correction characteristics (corrected tone values) indicating the current printer characteristics are calculated based on the calorimetric values.

FIG. 3 is a graph used for calculating tone correction characteristics based on the calorimetric values. This calculation will be described with reference to FIG. 1 and FIG. 3.

The first quadrant shows the relationship between test patch data (corrected tone values) stored on the personal computer and the actual calorimetric values of the printed test patches. This relationship is referred to as printer characteristics. The printer characteristics indicate the relationship between all the density levels of 0 to 255 that are inputtable to the printer and density levels that are to be actually printed by the printer based on the density levels of 0 to 255. Since calorimetric data has been measured at ten points for each color, interpolation is performed between each of these points to create the printer characteristics. The printer characteristics correspond to a relationship $f_1$ shown in FIG. 1 between the corrected tone values C'M'Y'K', which are inputted into the printer, and the colorimetric values of the patches outputted from the printer.

The second quadrant shows the ideal (target) characteristics stored on the personal computer. The ideal characteristics indicate a relationship between the input values CMYK, which have been obtained by the RGB-CMYK color conversion, and ideal colorimetric values, which are desired to be printed in response to the input values CMYK. The ideal characteristics correspond to the relationship $f_2$ in FIG. 1.

The fourth quadrant shows tone correction characteristics indicative of a relationship between the input values CMYK and the corrected tone values C'M'Y'K'. The tone correction characteristics are determined in the fourth quadrant based on the relationship between the printer characteristics in the first quadrant and the ideal characteristics in the second quadrant. The tone correction characteristics correspond to a relationship f shown in FIG. 1, which is determined based on the printer characteristics $f_1$ and the ideal characteristics $f_2$.

In order to perform calibration at a desired timing, test patches are printed, their density levels are measured, and tone correction characteristics (corrected tone values) are modified in order that the measured density levels (calorimetric values) will match the ideal density levels indicated by the ideal characteristics. Hence, by performing this calibration, it is possible to modify the tone correction characteristics to match the current printer characteristics, even when the printer characteristics vary due to environmental changes, replaced toner, or the like, thereby returning the printed density level characteristics to the ideal characteristics.

However, when a large change occurs between printer characteristics at the time of the previous calibration and current printer characteristics, calibration can cause a considerable change in the corrected tone values. Therefore, while it is effective to return characteristics of printed density levels to the ideal characteristics, the change in density levels before and after calibration can be considerable and may be perceived as a lack of color stability during a printing operation.

If toner is replaced while a large document, such as 100 pages, is being printed, it may be desired to perform calibration since a change in printer characteristics is expected. However, this calibration can greatly change the tone correction characteristics (corrected tone values). Accordingly, if this calibration were performed while printing a single document, this calibration will result in unpleasant output that is caused by an abrupt change in color density levels before and after the calibration.

In view of the foregoing, it is an object of the present invention to provide an image processing method and an image processing device capable of preventing abrupt changes in the characteristics of actual output density levels before and after corrected tone data is modified.

In order to attain the above and other objects, the present invention provides an image processing method. The image processing method includes: setting output characteristics indicative of a correspondence between a plurality of corrected input levels and a plurality of output levels by printing patches based on a part of the corrected input levels, by measuring density levels of the printed patches, and by setting the measured density levels as the output levels; predicting, based on the output characteristics and based on tone correction characteristics indicative of a plurality of input levels and a plurality of corrected input levels, actual printing characteristics indicative of a correspondence between the plurality of input levels and a plurality of density levels that are to be actually obtained when the plurality of input levels are corrected based on the tone correction characteristics and are printed based on the output characteristics; determining, based on the actual printing characteristics and predetermined target printing characteristics indicative of a correspondence between the plurality of input levels and a plurality of target density levels, whether a modification amount, by which the corrected input levels in the tone correction characteristics are required to be modified to bring the predicted actual printing characteristics to match to the target printing characteristics, is greater than a predetermined reference value, and determining a modification number when the modification amount is greater than the predetermined reference value; and modifying the corrected input values in the tone correction characteristics in steps of the modification number to bring the predicted actual printing characteristics closer to the target printing characteristics.

According to another aspect, the present invention provides an image processing device, including: an output-characteristics setting portion; a memory; a predicting portion; a modification-number determining portion; and a tone-correction-characteristics modifying portion. The output-characteristics setting portion sets output characteristics indicative of a correspondence between a plurality of corrected input levels and a plurality of output levels by controlling a printer to print patches based on a part of the corrected input levels, by controlling a calorimeter to measure density levels of the printed patches, and by setting the measured density levels as the output levels. The memory stores tone correction characteristics indicative of a plurality of input levels and a plurality of corrected input levels. The predicting portion predicts, based on the output characteristics and based on the tone correction characteristics, actual printing characteristics indicative of a correspondence between the plurality of input levels and a plurality of density levels that are to be actually obtained when the plurality of input levels are corrected based on the tone correction characteristics and are printed based on the output characteristics. The modification-number determining portion determines, based on the actual printing characteristics and predetermined target printing characteristics indicative of a correspondence between the plurality of input levels and a plurality of target density levels, whether a modification amount, by which the corrected input levels in the tone correction characteristics are required to be modified to bring the predicted actual printing characteristics to match to the target printing characteristics, is greater than a predetermined reference value, and determines a modification number when the modification amount is greater than the predetermined reference value. The tone-correction-characteristics modifying portion modifies the corrected input values in the tone correction characteristics in steps of the modification number to bring the predicted actual printing characteristics closer to the target printing characteristics.

According to another aspect, the present invention provides an image processing system. The image processing system includes: a printer; a colorimeter; and an image processing device. The image processing device includes: an output-characteristics setting portion; a memory; a predicting portion; a modification-number determining portion; and a tone-correction-characteristics modifying portion. The output-characteristics setting portion sets output characteristics indicative of a correspondence between a plurality of corrected input levels and a plurality of output levels by controlling the printer to print patches based on a part of the corrected input levels, by controlling the calorimeter to measure density levels of the printed patches, and by setting the measured density levels as the output levels. The memory stores tone correction characteristics indicative of a plurality of input levels and a plurality of corrected input levels. The predicting portion predicts, based on the output characteristics and based on the tone correction characteristics, actual printing characteristics indicative of a correspondence between the plurality of input levels and a plurality of density levels that are to be actually obtained when the plurality of input levels are corrected based on the tone correction characteristics and are printed based on the output characteristics. The modification-number determining portion determines, based on the actual printing characteristics and predetermined target printing characteristics indicative of a correspondence between the plurality of input levels and a plurality of target density levels, whether a modification amount, by which the corrected input levels in the tone correction characteristics are required to be modified to bring the predicted actual printing characteristics to match to the target printing characteristics, is greater than a predetermined reference value, and determines a modification number when the modification amount is greater than the predetermined reference value. The tone-correction-characteristics modifying portion modifies the corrected input values in the tone correction characteristics in steps of the modification number to bring the predicted actual printing characteristics closer to the target printing characteristics.

According to another aspect, the present invention provides a storage medium storing an image processing program readable by a computer. The image processing program, includes the programs of: setting output characteristics indicative of a correspondence between a plurality of corrected input levels and a plurality of output levels by controlling a printer to print patches based on a part of the corrected input levels, by controlling a calorimeter to measure density levels of the printed patches, and by setting the measured density levels as the output levels; predicting, based on the output characteristics and based on tone correction characteristics indicative of a plurality of input levels and a plurality of corrected input levels, actual printing characteristics indicative of a correspondence between the plurality of input levels and a plurality of density levels that are to be actually obtained when the plurality of input levels are corrected based on the tone correction characteristics and are printed based on the output characteristics; determining, based on the actual printing characteristics and predetermined target printing characteristics indicative of a correspondence between the plurality of input levels and a plurality of target density levels, whether a modification amount, by which the corrected input levels in the tone correction characteristics are required to be modified to bring the predicted actual printing characteristics to match to the target printing characteristics, is greater than a predetermined reference value, and determining a modification number when the modification amount is greater than the predetermined reference value; and modifying the corrected input values in the tone correction characteristics in steps of the modification number to bring the predicted actual printing characteristics closer to the target printing characteristics.

BRIEF DESCRIPTION OF THE DRAWINGS

The above and other objects, features and advantages of the invention will become more apparent from reading the following description of the preferred embodiments taken in connection with the accompanying drawings in which:

FIG. 5(b) is a flowchart showing an update process executed by the personal computer;

FIG. 8 is a flowchart showing a process for calculating smoothing characteristics executed by the personal computer;

FIG. 9 is a table stored in the smoothing correction characteristics memory;

FIG. 10(a) is a graph showing the relationships among corrected tone values, calorimetric values, input values, printer characteristics, actual printing characteristics, and tone correction characteristics;

FIG. 10(b) is an expanded view of the second quadrant in FIG. 10(a) showing the relationships among actual printing characteristics, ideal characteristics, and smoothing print characteristics;

FIG. 11(b) is a flowchart showing a process for calculating smoothing characteristics in the process of FIG. 11(a);

FIG. 11(c) is a table stored in the smoothing correction characteristics memory when the process of FIG. 11(a) is executed.

DETAILED DESCRIPTION OF THE PREFERRED EMBODIMENT

Figure 1:
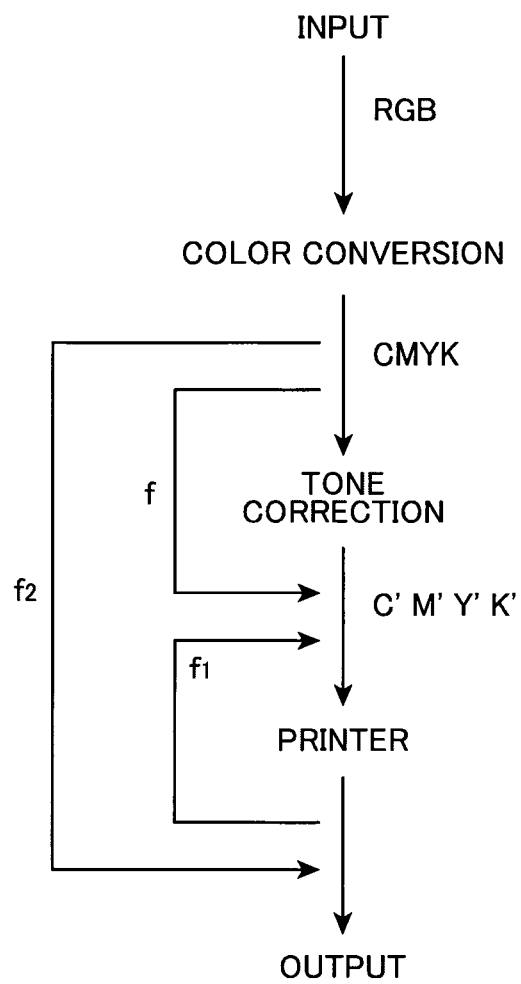
FIG. 1 is an explanatory diagram illustrating an image process executed by a personal computer.

An image processing method and an image processing device according to a preferred embodiment of the present invention will be described while referring to the accompanying drawings wherein like parts and components are designated by the same reference numerals to avoid duplicating description.

The image processing method and an image processing device according to the present embodiment will be described while referring to FIGS. 1, 2, and 4 through FIG. 10(b).

Figure 4:
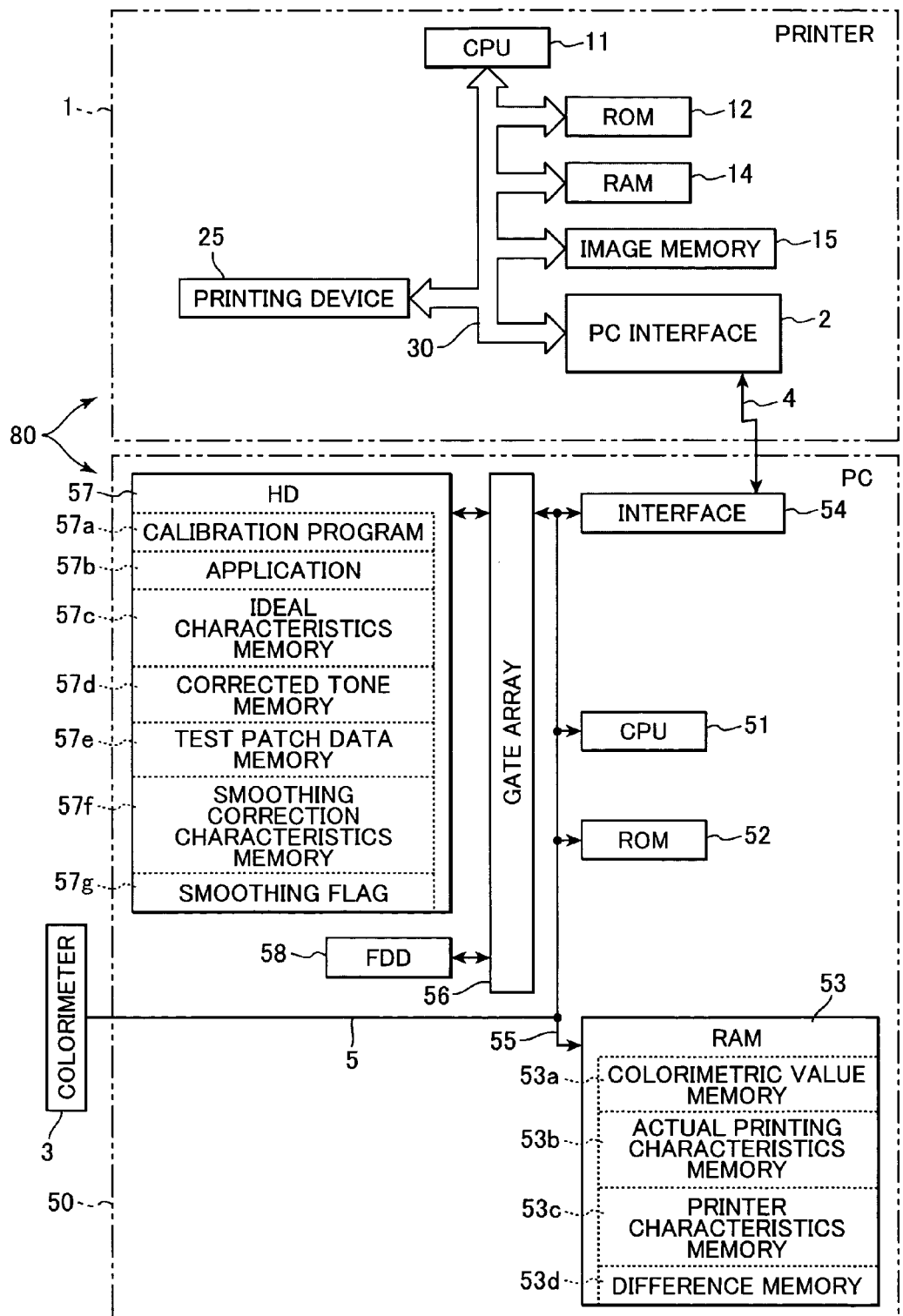
FIG. 4 is a block diagram showing the electrical configuration of a printer, a personal computer, and a calorimeter according to a preferred embodiment of the present invention.

FIG. 4 is a block diagram showing the electrical configuration of a color copy system 80 according to the present embodiment. The color copy system 80 includes a personal computer 50, a printer 1, and a calorimeter 3. The personal computer 50 and the printer 1 are connected and capable of performing data communications with each other via a special interface cable 4, while the personal computer 50 and calorimeter 3 are connected and capable of performing data communications with each other via a special interface cable 5.

A connector (not shown) for a PC interface 2 is provided on the printer 1 as a connection port. The printer 1 connects to the personal computer 50 via the special interface cable 4, which is connected to the PC interface 2. However, the connection of the printer 1 and the personal computer 50 is not limited to the special interface cable 4, but may be implemented by optical signals, such as infrared light. The calorimeter 3 measures the intensity of light reflected off an object to be measured, where the color of the object is separated into the three primary colors, and outputs the density of each primary color via the special interface cable 5 as calorimetric data.

The printer 1 includes a CPU 11, a ROM 12, a RAM 14, an image memory 15, and a printing device 25 that are all connected to one another via a bus line 30.

The CPU 11 controls each component connected to the bus line 30 based on control programs stored in the ROM 12 to execute printing operations and the like. The ROM 12 is a read only memory for storing control programs and the like executed by the printer 1. The RAM 14 is a volatile memory that is rewritable and functions to temporarily store various data used when the printer 1 executes various operations.

The PC interface 2 is a parallel interface based on the Centronics standard, for example. The printer 1 is connected to the personal computer 50 by the special interface cable 4 connected to the PC interface 2 and transmits and receives image data, various commands, and the like to and from the personal computer 50 via the special interface cable 4.

The printer 1 is a laser printer in which the printing device 25 employs laser light to deposit toner on a photosensitive member and transfers this deposited toner onto paper using heat and pressure in order to print an image. The printing device 25 can perform color printing using the four colors of toner cyan (C), magenta (M), yellow (Y), and black (K) and can execute multi-tone printing with 256 density levels for each color.

The personal computer 50 is provided with a CPU 51, a ROM 52, a RAM 53, an interface 54, a gate array 56, a hard disk device 57, and a flexible disk drive 58. The CPU 51, the ROM 52, the RAM 53, the interface 54, and the gate array 56 are connected with one another via a bus line 55.

The CPU 51 is a computing device that performs various control operations based on basic programs stored in the ROM 52, an operating system and various application programs stored on the hard disk device 57, and computer programs supplied from a flexible disk through the flexible disk drive 58.

The ROM 52 is a non-rewritable, nonvolatile memory for storing various data, as well as the basic programs executed by the CPU 51.

The RAM 53 is a rewritable, volatile memory for temporarily storing various data used when the CPU 51 executes various programs. The computer programs supplied from the hard disk device 57 and supplied from a flexible disk (not shown) via the flexible disk drive 58 are loaded into the RAM 53 when needed and executed by the CPU 51.

The functions possessed by the color copy system 80 are the same as those shown in FIG. 1.

More specifically, data for the three colors red (R), green (G), and blue (B), which form the color system of a monitor (not shown) used by the personal computer 50, is converted to data for the four colors C, M, Y, and K, which make up the color system of toner used by the printer. In order to improve color reproducibility, the personal computer 50 corrects the color tones of the converted CMYK data (hereinafter referred to as the input values) based on the output characteristics of the printer, producing the data C'M'Y'K' (hereinafter referred to as the corrected values). The personal computer 50 performs binarization on this C'M'Y'K' data and transmits the resulting binary data to the printer 1.

The RAM 53 is provided with a calorimetric value memory 53a, an actual printing characteristics memory 53b, a printer characteristics memory 53c, and a difference memory 53d that are used by a calibration program 57a stored on the hard disk device 57.

The calorimetric value memory 53a is for storing measured values of density levels for color patches printed out by the printer 1. When execution of a calibration process described later with reference to FIG. 5(a) has been selected, the printer 1 prints out color patches, which are the same as those shown in FIG. 2. Using the calorimeter 3, the user measures the density levels of each color patch, and the measured values are written to the calorimetric value memory 53a.

The actual printing characteristics memory 53b is for storing actual printing characteristics R[i] for each of the CMYK colors. The actual printing characteristics R[i] indicate the relationship between all the inputtable input values (density levels) i of 0 to 255 and density levels predicted to be measured for colors that will be actually printed based on the input values i of 0 to 255. When execution of a calibration is selected in the calibration process of FIG. 5(a), the calorimetric values for the color patches in the calorimetric value memory 53a are updated to obtain the current printer characteristics. The actual printing characteristics R[i] are calculated based on the printer characteristics, and the actual printing characteristics memory 53b is updated using the new actual printing characteristics R[i].

The printer characteristics memory 53c is for storing printer characteristics. The printer characteristics indicate the relationship between the test patch data (corrected tone values) and calorimetric values for actual printed output. In a test patch scanning process of FIG. 6, calorimetric values are obtained for printed test patches and interpolation is performed between each data to find a one-to-one correspondence between 256 number of density levels (0-255) of corrected tone values i' and 256 colorimetric values. This relationship is stored in the printer characteristics memory 53c as printer characteristics.

The difference memory 53d is for storing the difference between predetermined ideal characteristics T[i] (target characteristics) and the actual printing characteristics R[i]. The predetermined ideal characteristics T[i] are stored for each CMYK color in an ideal characteristics memory 57c of the hard disk device 57 described later and indicate the relationship between all the inputtable input values (density levels) i of 0-255 and ideal density levels that should be obtained in printed output based on the input values i of 0-255.

The differences between the ideal characteristics T[i] and the actual printing characteristics R[i] indicate, for each input value i of 0-255, the difference between the ideal output density level and the density level predicted to be printed actually according to the current printer characteristics. It is possible to predict that as these differences increase, the amount of fluctuation in density levels that will occur during the calibration process will increase.

Figure 5A:
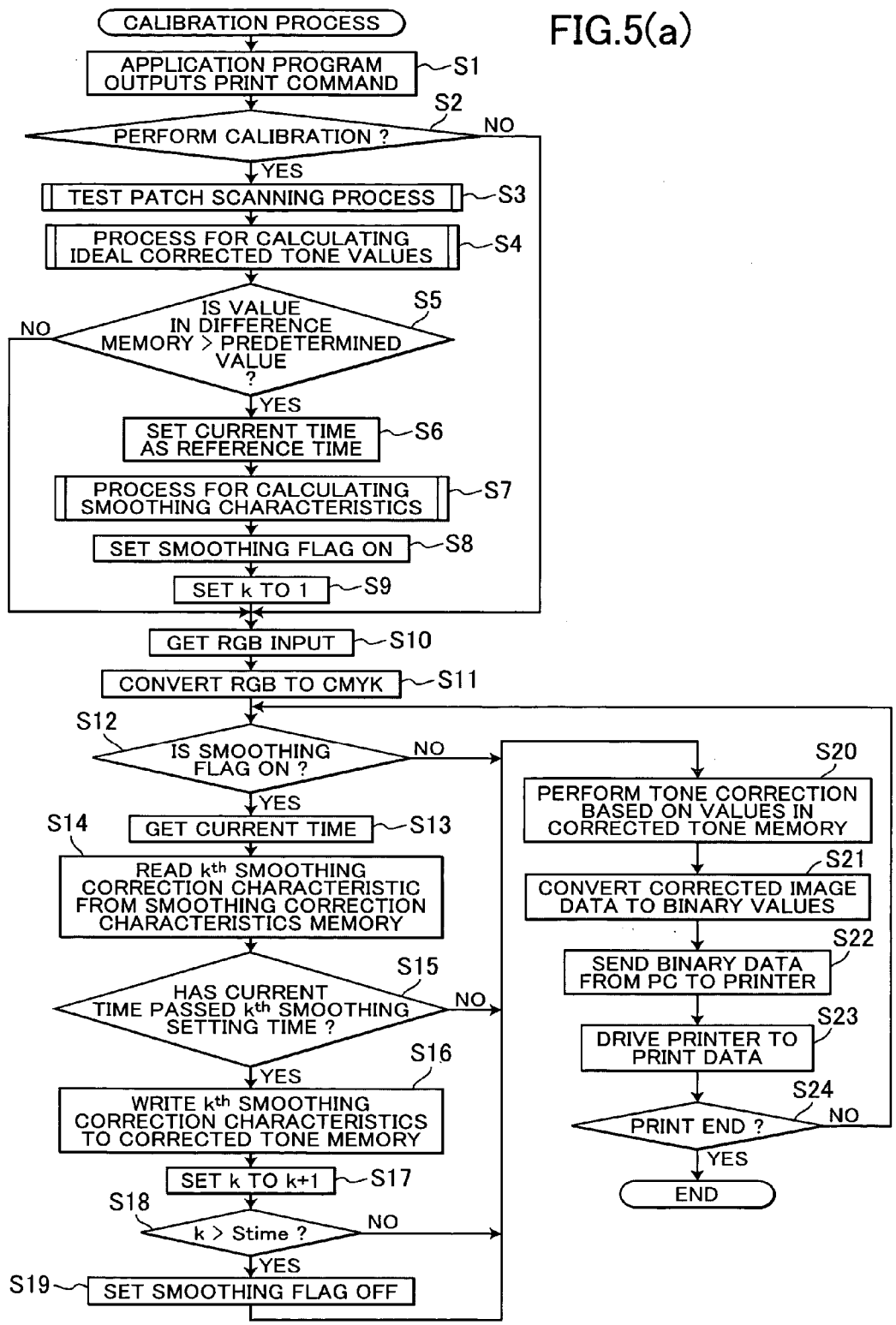
FIG. 5(a) is a flowchart showing a calibration process executed by the personal computer.

When values in the actual printing characteristics memory 53b are updated during the calibration process of FIG. 5(a), differences between the ideal characteristics T[i] and the actual printing characteristics R[i] are calculated for all the colors and for all the density levels i (0-255). The largest value among the calculated differences is stored in the difference memory 53d.

The hard disk device 57 is a large-capacity, rewritable memory that stores the operating system for the personal computer 50 and various application programs. The hard disk device 57 includes the calibration program 57a for executing the calibration process of FIG. 5(a), an application program 57b that outputs print commands, the ideal characteristics memory 57c, a corrected tone memory 57d, a test patch data memory 57e, a smoothing correction characteristics memory 57f, and a smoothing flag 57g.

The ideal characteristics memory 57c stores therein the predetermined ideal characteristics T[i]. The ideal characteristics T[i] show the relationship between all the inputtable density levels i (input values) of 0-255 for CMYK data, which has been converted from RGB data, and ideal calorimetric values desired to be printed for these density levels i. The ideal characteristics T[i] are set for each CMYK color.

The corrected tone memory 57d is for storing corrected tone values calculated in the calibration process of FIG. 5(a). The corrected tone values are determined in the calibration process of FIG. 5(a) so that printing can be performed in colors that match the originally inputted colors, independent from individual printer characteristics.

Specifically, corrected tone values i' are determined in one-to-one correspondence with all the inputtable input values i (0-255), and are stored in the corrected tone memory 57d in the form of a one-dimensional look-up table. The one-to-one correspondence between all the input values i and the corrected tone values i' indicate tone correction characteristics. The tone correction characteristics are determined for each of the CMYK colors, and are stored as four one-dimensional look-up tables in the corrected tone memory 57d. The corrected tone memory 57d is for correcting input values CMYK to corrected tone values C' M'Y'K'. A corrected tone value C' for the input value for C is determined by referencing the one-dimensional look-up table for cyan stored in the corrected tone memory 57d.

Figure 2:
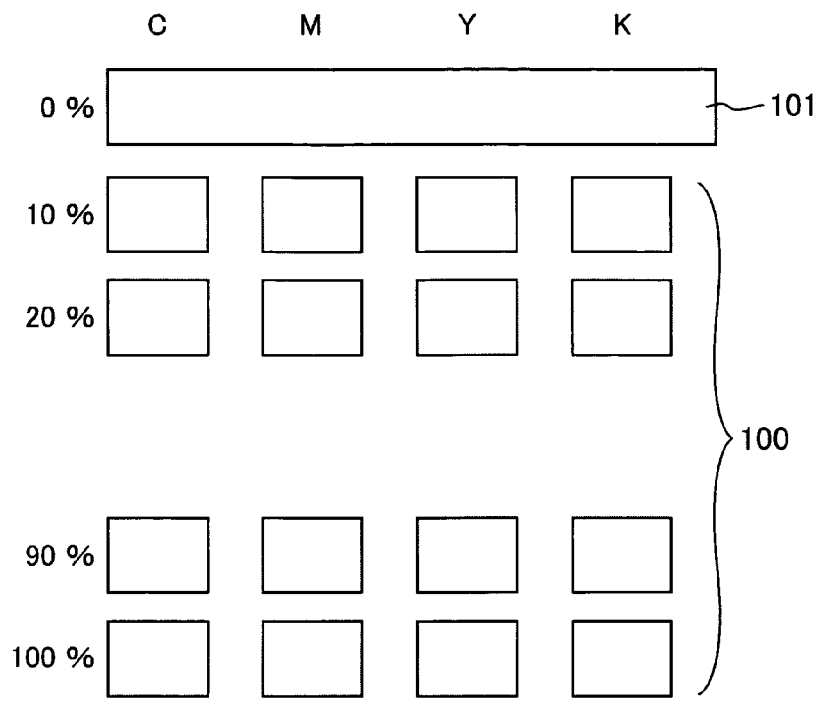
FIG. 2 is an explanatory diagram showing test patches produced by printing test patch data.
Figure 3:
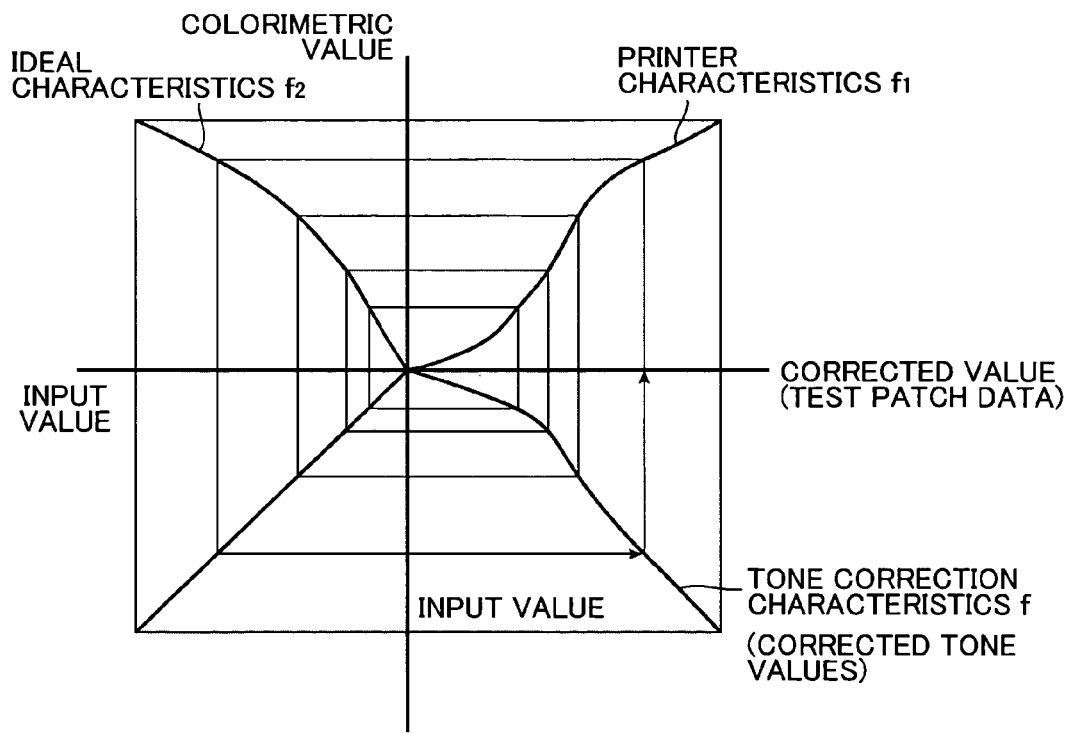
FIG. 3 is a graph showing the relationships among actual colorimetric values, ideal characteristics, and tone correction characteristics in a conceivable calibration process.

The test patch data memory 57e stores predetermined test patch data. This test patch data includes ten density levels (input levels) for each of the CMYK colors and one density level in which all of the CMYK values are 0. This data is used for controlling the printer 1 to print 4×10+1=41 patches, where each patch is of a square shape and has a sufficient area for the colorimeter 3 to measure density levels. Upon receiving this data, the printer 1 prints forty-one patches 100 and 101, as shown in FIG. 2.

The smoothing correction characteristics memory 57f is for storing smoothing correction characteristics S'(j)[i], where j is the number of smoothing times to be described later, determined during the process for calculating smoothing characteristics of FIG. 8.

When the difference between the actual printing characteristics R[i] and the ideal characteristics T[i] is relatively large, if one attempted to modify the tone correction characteristics (corrected tone values) in a single step in order to match the actual printing characteristics R[i] with the ideal characteristics T[i] during the calibration process of FIG. 5(a), the density levels of the printed output will change too abruptly. With the present embodiment, therefore, smoothing print characteristics S(j)[i] are set between the actual printing characteristics R[i] and the ideal characteristics T[i] and the actual printing characteristics R[i] are made to gradually approach the ideal characteristics T[i] in a plurality of steps through the smoothing print characteristics S(j)[i]. The smoothing correction characteristics S'(j)[i] are determined based on the smoothing print characteristics S(j)[i], and are stored in the smoothing correction characteristics memory 57f.

The smoothing flag 57g indicates whether or not to execute the corrected-tone-value modifying process (smoothing process) in the calibration process. The smoothing flag 57g is set to ON if it is determined that the differences between the actual printing characteristics R[i] and the ideal characteristics T[i] are so large that the density levels of printed colors will change too abruptly if one attempted to modify the corrected tone values in a single step to match the actual printing characteristics R[i] with the ideal characteristics T[i]. The smoothing flag 57g is returned to OFF after modification of the corrected tone values has been repeated by the smoothing number of times $S_{time}$ to be described later.

The flexible disk drive 58 is for reading and writing programs and data from and to a flexible disk that is mounted therein.

Next, the calibration process will be described with reference to the flowcharts in FIG. 5(a) through FIG. 8.

The calibration process is executed by the personal computer 50 according to the calibration program 57a.

First, in S1 of FIG. 5(a), the calibration process begins when the application program 57b outputs a print command.

In S2 the personal computer 50 prompts the user to indicate whether or not to perform calibration. If the user indicates a desire to perform calibration because a toner cartridge has been replaced, a considerable amount of time has passed since the previous calibration process, or for some other reason (S2: YES), then the CPU 51 advances to S3 to execute a test patch scanning process.

Figure 6:
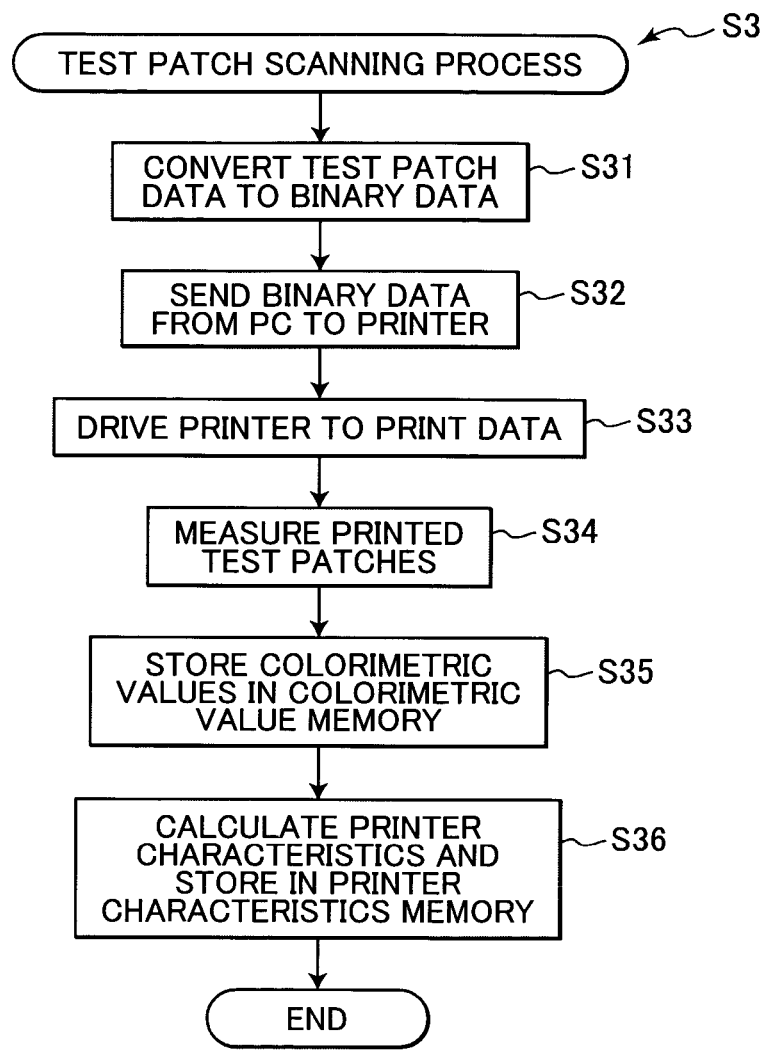
FIG. 6 is a flowchart showing a test patch scanning process executed by the personal computer.

FIG. 6 is a flowchart showing the test patch scanning process.

In S31 the CPU 51 reads the test patch data from the test patch data memory 57e, subjects the data to binarization, and in S32 transmits the resulting binary data to the printer 1. After receiving the data, in S33 the printer 1 prints out test patches required for measuring density levels.

In S34 the calorimeter 3 is used to measure the density level of each color test patch printed in the process of S33. The density levels of the test patches at the same input level are measured for all the CMYK colors at the same time, and the order in which the test patches are measured is set such that the density level for each color becomes gradually darker. These calorimetric values are transmitted to the personal computer 50. Upon receiving calorimetric values from the calorimeter 3, the personal computer 50 stores these values in the calorimetric value memory 53a in S35 based on the assumption that measurements have been performed according to the above-described order.

In the preferred embodiment, the calorimetric value refers to optical density and is expressed by "$-\log_{10}$ (reflectance)". If the object being measured is white, the reflectance is 1 and, hence, the calorimetric value is 0. If the object is black, the reflectance is 0 and, hence, the calorimetric value is infinitely large. Hence, the calorimetric value can express the density level of the object's color and can be a value from zero (0) to infinity.

In S36 the CPU 51 calculates, for each color, the relationship between the density levels (output levels) of the printed test patches and the test patch data (corrected tone levels) using the calorimetric values stored in the calorimetric value memory 53a in S35. In other words, the CPU 51 calculates the printer characteristics and stores these values in the printer characteristics memory 53c. The first quadrant in FIG. 10(a) shows the printer characteristics that indicate the relationship between the test patch data and the calorimetric values. Specifically, since there are ten points of test patch data and calorimetric values for each color (eleven points when including the density level of 0), interpolation is performed between these points to find a calorimetric value for each density level (0-255) of the corrected tone data and creates the printer characteristics in this way. Any method may be used to determine interpolation data. For example, it is possible to perform linear interpolation between two adjacent points or, in order to fit a quadratic curve or the like, to find the most probable approximation using the least-squares method or the like.

Next, the CPU 51 advances to S4 in FIG. 5(a) and performs a process to calculate ideal corrected tone values with respect to all the inputtable input levels of 0 to 255. The relationship between the ideal corrected tone values with respect to the input levels of 0 to 255 is referred to as ideal tone correction characteristics.

Figure 7:
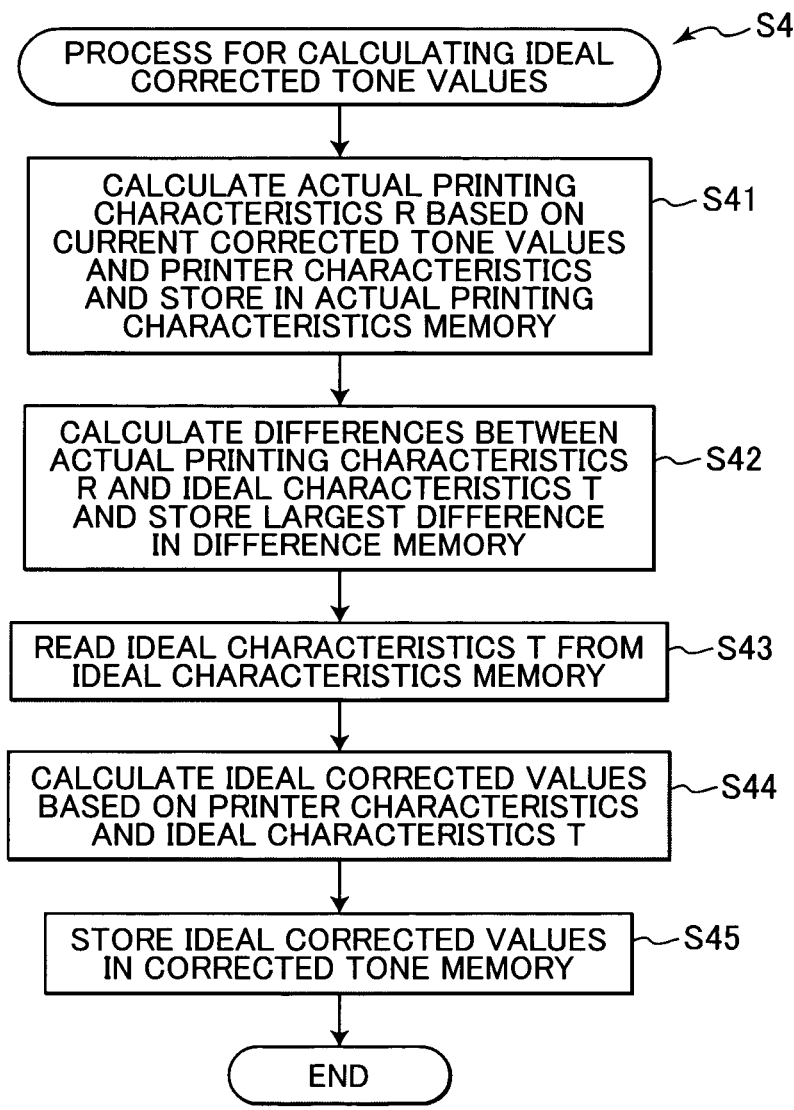
FIG. 7 is a flowchart showing a process for calculating tone correction characteristics (corrected tone values) executed by the personal computer.

FIG. 7 is a flowchart showing steps in the process to calculate ideal corrected tone values with respect to all the input levels of 0 to 255.

First, in S41 of this process the CPU 51 calculates the actual printing characteristics R[i] based on corrected tone values that are currently stored in the corrected tone memory 57d and based on the printer characteristics created in S36. The actual printing characteristics R[i] are calculated for each of the CMYK colors. However, for simplification, description of this calculation will be given only for C (cyan).

It is noted that the corrected tone values are currently stored in the corrected tone memory 57d with respect to all the input levels of 0 to 255 in the form of a one-dimensional look-up table. The relationship between the currently-stored corrected tone values and the input levels of 0 to 255 is referred to as current tone correction characteristics. The current tone correction characteristics have been stored in the corrected tone memory 57d during another calibration process of FIG. 5(a) that has been executed at the latest, during an update process of FIG. 5(b) to be described later that has been executed at the latest, or when the calibration program 57a has been loaded in the hard disk device 57.

The current corrected tone value i' (C', in this example) corresponding to each input value i (C, in this example) of 0-255 is read out from the one-dimensional look-up table stored in the corrected tone memory 57d. Using these current corrected tone values and the current printer characteristics found in S36, the CPU 51 calculates the actual printing characteristics R[i], that is, the relationship between each input value i and colorimetric values that are predicted to be actually obtained in a printed output if the input value i is corrected into a corrected tone value i' according to the current tone correction characteristics and the corrected tone value i' is printed according to the current printer characteristics.

To describe this conceptually using FIG. 10(a), a corrected tone value i' is obtained for each input value i based on the current tone correction characteristics indicated by the dotted line in the fourth quadrant, and a colorimetric value is predicted for when the corrected tone value i' is actually printed according to the current printer characteristics indicated by a solid line in the first quadrant. In this way, the CPU 51 determines the actual printing characteristics R[i] indicated by a dotted line in the second quadrant of FIG. 10(a). The actual printing characteristics R[i] indicate the relationship between the input values i of all the density levels and the density levels (calorimetric values) predicted to be obtained on printed outputs.

After performing this calculation, the CPU 51 stores in S41 the actual printing characteristics R[i] in the actual printing characteristics memory 53b by storing the calorimetric values in association with the input value i for each density level (0-255).

In S42 the CPU 51 calculates the differences between the actual printing characteristics R[i] and the ideal characteristics T[i], and stores the largest value among these differences in the difference memory 53d. The actual printing characteristics R[i] are stored in the actual printing characteristics memory 53b for each color in association with the input value i of each density level. The ideal characteristics T[i] are stored in the ideal characteristics memory 57c for each color in association with the input value i of each density level. The actual printing characteristics R[i] are indicated by the dotted line in the second quadrant and represent the calorimetric values predicted to be actually printed by the current printer characteristics with the input values i for all the density levels (0-255). The ideal printing characteristics T[i] are indicated by the solid line in the second quadrant and represent calorimetric values desired to be ideally printed with the input values i for all the density levels (0-255).

The CPU 51 calculates, for each color, the difference between the actual printing characteristics R[i] and the ideal characteristics T[i] for each density level i of the input values. It is now assumed that for the input value C of 200, the calorimetric value R[200] predicted to be actually printed is 2.0, while the calorimetric value T[200] desired to be ideally printed is 1.8, then the difference is 2.0−1.8=0.2. This difference is the absolute value of the value obtained by subtracting the actual printing characteristics R[i] from the ideal characteristics T[i] as shown in FIG. 10(b). The difference is calculated for all the density levels i of 0 to 255 for all the CMYK colors, and the largest value among all the differences is stored in the difference memory 53d.

In S43 the CPU 51 reads the ideal characteristics T[i] from the ideal characteristics memory 57c.

In S44 the CPU 51 calculates corrected tone values for ideal tone correction characteristics based on the current printer characteristics and the ideal characteristics T[i].

As shown in FIG. 1, a tone correction characteristic f for correcting CMYK data to C'M'Y'K' data is obtained based on a printer characteristic $f_1$ representing the relationship between corrected tone values C'M'Y'K' and printed calorimetric values and an ideal characteristic $f_2$ indicating the relationship between CMYK data and calorimetric values for ideally outputted density levels. To describe this conceptually using FIG. 10(a), it is possible to determine the ideal correction characteristics indicated by the solid line in the fourth quadrant. The ideal correction characteristics indicate the relationship between the input values i and ideal corrected tone values i', and are determined based on the printer characteristics in the first quadrant and the ideal characteristics T[i] indicated by the solid line in the second quadrant.

In S45 the CPU 51 stores, for each color, the ideal corrected tone values i' in the corrected tone memory 57d in the form of a one-dimensional look-up table and in association with the input values i of the density levels (0-255). In other words, the CPU 51 overwrites the current corrected tone values i' with the ideal corrected tone values i' in the corrected tone memory 57d.

Returning to S5 of FIG. 5(a), the CPU 51 determines whether the value in the difference memory 53d is greater than a predetermined reference value, such as 0.1. If the value in the difference memory 53d is less than or equal to 0.1 (S5: NO), then it is known that a large change in the outputted density levels will not occur even if the current tone correction characteristics were modified into the ideal tone correction characteristics in a single step to match the actual printing characteristics. R[i] to the ideal characteristics T[i]. Accordingly, since no significant problems will arise by updating the corrected tone memory 57d with the ideal corrected tone values calculated in S44 in a single step, the CPU 51 advances to S10.

However, if the value in the difference memory 53d is greater than the predetermined reference value (S5: YES), then it is known that the current tone correction characteristics have to be modified by a large amount in order to modify the current tone correction characteristics into the ideal tone correction characteristics. Accordingly, it is known that if the current correction characteristics are modified into the ideal correction characteristics in a single step, the density levels of printed output will change considerably from before modification to after modification.

When a positive determination is made in S5, then the CPU 51 advances to S6 and sets the current time as a reference time. For example, if the current time is 13:45, then the reference time is set to 13:45.

In S7, the CPU 51 performs a process to calculate smoothing characteristics.

FIG. 8 is a flowchart showing steps in the process to calculate smoothing characteristics.

In S71 of this process, the CPU 51 calculates the number of smoothing times $S_{time}$ based on the value in the difference memory 53d. Specifically, the CPU 51 calculates the number of smoothing times $S_{time}$ by dividing the value in the difference memory 53d by a predetermined smoothing reference value, such as 0.1. If the value stored in the difference memory 53d is 0.5, for example, then the number of smoothing times $S_{time}$ is calculated by 0.5/0.1=5.

In S72 the CPU 51 determines smoothing print characteristics S(j [i] based on the actual printing characteristics R[i] and the ideal characteristics T[i] by calculating the following equation (1):

$$S(j)[i] = \{(R[i]-T[i])/S_{time}\} * j + T[i] \quad (1)$$

wherein i is the input value ($0 \leq i \leq 255$) and j is the number of smoothing times ($0 \leq j < S_{time}$).

In this way, a plurality of sets of smoothing print characteristics S(j)[i], wherein $0 \leq i < 255$, are determined in correspondence with a plurality of smoothing time numbers j of $0 \leq j < S_{time}$.

FIG. 10(b) is a graph showing the relationships among the actual printing characteristics R[i], the ideal characteristics T[i], and the smoothing print characteristics S(j)[i], and corresponds to the second quadrant of FIG. 10(a). In this example, we will consider the case in which the input value is 50. If the input value i (C for cyan, for example) is 50, then the ideal characteristic value T[50] (1.0 in this example) is read from the one-dimensional look-up table stored in the ideal characteristics memory 57c and the actual print characteristic value R[50] (1.2 in this example) is read from the one-dimensional look-up table stored in the actual printing characteristics memory 53b. If $S_{time}$ is 2, then j takes on the values 0 and 1 from the expression $0 \leq j < S_{time}$. In this example, two sets of smoothing print characteristics S(j)[i] for i (C) of 50 are obtained as follows:

$$S(0)[50] = \{(1.2-1.0)/2\} \times 0 + 1.0 = 1.0$$

$$S(1)[50] = \{(1.2-1.0)/2\} \times 1 + 1.0 = 1.1$$

The smoothing print characteristics S(j)[i] are calculated for the input values i ($0 \leq i \leq 255$) for each color. According to the present embodiment, the values in the corrected tone memory 57d will be repeatedly overwritten in the process of S16 described later so that the actual print characteristic value S[50] for i (C, in this example) of 50 will change to S(1) [50] and then to S(0) [50]. In other words, the actual print characteristic value R[50] for i (C, in this example) of 50 gradually approaches the ideal characteristic value T[50] in two steps, as in 1.2→1.1→1.0.

In S73 the CPU 51 calculates smoothing correction characteristics S'(j)[i], which correspond to the smoothing print characteristics S(j)[i], based on the smoothing print characteristics S(j)[i] calculated in S72. To describe this conceptually using the graph of FIG. 10(a), the smoothing correction characteristics S'(j)[i] are obtained in the fourth quadrant by overwriting the actual printing characteristics R with the smoothing print characteristics S(j)[i] in the second quadrant. In other words, the smoothing print characteristics S(j)[i] can be obtained instead of the ideal print characteristics T by using the smoothing correction characteristics S'(j)[i] in place of the ideal correction characteristics. A plurality of sets of smoothing correction characteristics S'(j)[i] are calculated in one-to-one correspondence with a plurality of sets of smoothing print characteristics S(j)[i] for the plurality of values j of 0 to ($S_{time}$−1).

In S74 the CPU 51 associates a smoothing type number k and a smoothing setting time with each set of smoothing correction characteristic S' (j) with a value j (0≤j<$S_{time}$) and in S75 stores this data in the smoothing correction characteristics memory 57f.

FIG. 9 is a table showing the correlations of smoothing type number (k) and smoothing setting time with one set of smoothing correction characteristics S'(j), wherein the set of smoothing correction characteristics S'(j) include corrected tone values S'(j)[0] to S'(j)[255]. Specifically, smoothing type No. k (1≤k≤$S_{time}$) is assigned to one set of smoothing correction characteristic S'(j), wherein k=$S_{time}$−j.

For example, if the number of smoothing times $S_{time}$ is 3, then a set of smoothing correction characteristics S'(2)[0]-S'(2)[255] is assigned the smoothing type No. 1, another set of smoothing correction characteristic S'(1)[0]-S'(1)[255] is assigned the smoothing type No. 2, and still another set of smoothing correction characteristics S'(0)[0]-S'(0)[255] is assigned the smoothing type No. 3.

The reference time set in S6 (13:45 in this example) is assigned to the column under smoothing type No. 1 (k=1). Subsequent smoothing setting times, which are shifted from one another by a predetermined time interval, are set to the subsequent smoothing type numbers (k=2, . . . ). For example, if the predetermined time interval is 30 minutes and the reference time is 13:45, then the setting time 13:45 is assigned to smoothing type No. 1, the setting time 14:15 is assigned to smoothing type No. 2, and the setting time 14:45 is assigned to smoothing type No. 3.

By assigning smoothing setting times in this way, the plurality of sets of smoothing correction characteristics S'(j) are stored in the smoothing correction characteristics memory 57f in association with the smoothing setting times as shown in FIG. 9. The table for smoothing correction characteristics S' shown in FIG. 9 is created for each color.

Returning to FIG. 5(a), next in S8, the CPU 51 sets the smoothing flag 57g to ON, and in S9 sets a variable k to 1.

In S10 the CPU 51 acquires RGB data, for which the application program 57b has commanded a printing operation.

In S11 the CPU 51 converts this RGB data to CMYK data.

In S12 the CPU 51 determines whether the smoothing flag 57g is ON.

If the smoothing flag 57g is ON (S12: YES), then in S13 the CPU 51 acquires the current time.

In S14 the CPU 51 reads one set of smoothing correction characteristics S'(j)[0]-S'(j)[255], wherein j=$S_{time}$−k for the smoothing type No. k from the smoothing correction characteristics memory 57f. When k=1, for example, the CPU 51 reads one set of smoothing correction characteristics S'(j)[0]-S'(j)[255] in the column under the smoothing type No. 1. When k=2, the CPU 51 reads another set of smoothing correction characteristics S' S'(j)[0]-S'(j)[255] in the column under the smoothing type No. 2.

In S15 the CPU 51 determines whether the current time acquired in S13 has passed the smoothing setting time under smoothing type No. k.

For example, if k=1 and the current time has passed the setting time 13:45 for the smoothing type No. 1 in FIG. 9 (S15: YES), then the CPU 51 advances to S16. Similarly, if k=2 and the current time has passed the setting time 14:15 for the smoothing type No. 2 (S15: YES), then the CPU 51 advances to S16.

In S16 the CPU 51 overwrites the corrected tone values i' stored in the corrected tone memory 57d with the $k^{th}$ smoothing correction characteristics S'(j=$S_{time}$−k)[0]-S'(j=$S_{time}$−k)[255]. In this example, if k=1, then the CPU 51 writes the values in the column under smoothing type No. 1 to the corrected tone memory 57d. Since the CMYK density levels will undergo tone correction according to the corrected tone values stored in the corrected tone memory 57d (the smoothing correction characteristics S'(j=$S_{time}$−k) [0]-S'(j=$S_{time}$−k)[255] in the column under smoothing type No. 1) in the process of S20 described later, the actual printing characteristics R[i] will be modified to match the corresponding smoothing print characteristics S(j=$S_{time}$−k)[0]-S(j=$S_{time}$−k)[255].

As described in the process of S72, the smoothing print characteristics S(j) are set such that the actual printing characteristics R[i] gradually approach the ideal characteristics T[i] in steps through the $S_{time}$ number of sets of smoothing print characteristics S(j). This ensures that changes in color density levels caused by each step of calibration can be made smaller than when calibrating the actual printing characteristics to meet the ideal characteristics in one step.

In S17 the CPU 51 increments k by 1.

In S18 the CPU 51 determines whether k is greater than the number of smoothing times $S_{time}$.

If k is greater than the number of smoothing times $S_{time}$ (S18: YES), it is known that the corrected tone values have been modified the predetermined number of smoothing times $S_{time}$ and that the actual printing characteristics R have been modified to match the ideal characteristics T. More specifically, when k=$S_{time}$, then j=$S_{time}$−k=0. From Equation (1), S[i]=T[i] when j=0. Accordingly, when the corrected tone values have been modified the $S_{time}$ number of times, it is known that the calibration has been achieved. Therefore when k is greater than $S_{time}$, in S19 the CPU 51 sets the smoothing flag 57g to OFF and advances to S20.

In S20 the CPU 51 performs tone correction on the CMYK data to convert CMYK data into C'M'Y'K' data based on the values in the corrected tone memory 57d that have been updated in S16, that is, the smoothing correction characteristics S'(j=$S_{time}$−k)[0]-S'(j=$S_{time}$−k)[255] of the smoothing type No. k.

On the other hand, if the user has not selected execution of calibration in S2 (S2: NO), then the CPU 51 advances to S10 without updating the corrected tone memory 57d in S4, and in S12 determines whether the smoothing flag 57g is ON. If the smoothing flag 57g is OFF (S12: NO), then the CPU 51 advances to S20 and performs the tone correction based on the corrected tone values that are being presently stored in the corrected tone memory 57d. In this case, the corrected tone memory 57d has not been updated in S4. Therefore, in S20 the CPU 51 performs correction based on the corrected tone values the same as those that have been used in the previous printing process.

However, if the user has not selected to perform calibration in S2 (S2: NO), but the CPU 51 determines in S12 that the smoothing flag 57g is ON (S12: YES), then the CPU 51 determines that the actual printing characteristics R have not yet matched the ideal characteristics T, in other words, that the corrected tone values have not yet been corrected the $S_{time}$ number of times, even when the user had selected to execute calibration the previous time (S2: YES) and the $S_{time}$ number of sets of smoothing correction characteristics S' had been set. Therefore, in S14 the CPU 51 reads one set of smoothing correction characteristics S'(j) corresponding to the variable k at that point in time.

One example in which this case applies is when the user has indicated a desire to execute calibration the previous time, the smoothing correction number of times $S_{time}$ has been set to 5, and the corrected tone values stored in the corrected tone memory 57d have been updated (smoothing correction) every 30 minutes, but the power has been turned off while performing the fourth smoothing correction. When the power is turned on again and the application program outputs print command, since the smoothing flag 57g is still set to ON in this case, the CPU 51 reads one set of smoothing correction characteristics S'(j) for the smoothing type No. 5 in S14 and updates the corrected tone memory 57d based on the set of smoothing correction characteristics S'(j).

Further, if the current time has not yet reached the smoothing setting time for the smoothing type No. k (S15: NO), then the CPU 51 advances to S20 without updating the values stored in the corrected tone memory 57d and performs tone correction based on the corrected values that have been used previously. Therefore, the values in the corrected tone memory 57d are not updated until the predetermined time interval has been elapsed after the corrected tone memory 57d had been updated. In this way, it is possible to prevent giving the user an unpleasant impression by updating the corrected tone values several times while printing a single document, causing the density levels in the printed output to change several times.

In S21 the CPU 51 performs binarization on the corrected data C'M'Y'K', which have been obtained through tone correction of S20, using a technique well known in the art.

In S23 the CPU 51 transmits the binary data from the personal computer 50 to the printer 1, driving the printer 1 to print out the data.

In S24, the CPU 51 judges whether or not all the CMYK data has been printed. If any CMYK data has not yet been printed (no in S24), the program returns to S12. If all the CMYK data has been printed (yes in S24), the program ends.

With the present embodiment, when the differences between the actual printing characteristics R[i] and the ideal characteristics T[i] are greater than the reference value, as shown in FIG. 10(b), the actual printing characteristics R[i] are not modified to match the ideal characteristics T[i] in a single step of calibration. Instead, the corrected tone values stored in the corrected tone memory 57d are gradually calibrated so that the actual printing characteristics R[i] gradually approach the ideal characteristics T[i] in steps, passing through the smoothing print characteristics S(j)[i], which are set between the actual printing characteristics R[i] and the ideal characteristics T[i]. When the predetermined period of time has passed after the corrected tone values had been modified, the corrected tone values are further modified.

In the preferred embodiment, an update process of FIG. 5(b) is performed separately from the calibration process of FIG. 5(a). The update process is executed after the power is turned on but while the calibration process of FIG. 5(a) is not executed. The update process is executed to repeatedly acquire the current time at a predetermined time interval. When the acquired time has reached the smoothing setting time for the smoothing type No. k, the CPU 51 overwrites the corrected tone memory 57d with a set of smoothing correction characteristics S'(j=$S_{time}$-k)[0]-S'(j=$S_{time}$-k)[255] for the smoothing type No. k, and then increments the variable k.

More specifically, the update process of FIG. 5(b) is executed repeatedly at the predetermined time interval after the power is turned on. When the update process is executed, the CPU 51 first acquires the current time in S81. Then, in S82, the CPU 51 judges whether the smoothing flag 57g is on. If the smoothing flag 57g is off (no in S82), the program ends. On the other hand, if the smoothing flag 57g is on (yes in S82), the CPU 51 reads the set of smoothing correction characteristics S'(j=$S_{time}$-k)[0]-S'(j=$S_{time}$-k)[255] for the smoothing type No. k in S84, and judges in S85 whether or not the acquired time has reached the smoothing setting time for the smoothing type No. k. When the acquired time has not yet reached the smoothing setting time for the smoothing type No. k (no in S85), the program ends. On the other hand, when the acquired time has reached the smoothing setting time for the smoothing type No. k (yes in S85), in S86 the CPU 51 overwrites the corrected tone memory 57d with the set of smoothing correction characteristics S'(j=$S_{time}$-k)[0]-S'(j=$S_{time}$-k)[255] for the smoothing type No. k. Then, in S87, the CPU 51 increments the variable k. When the variable k exceeds the value $S_{time}$(yes in S88), the smoothing flag 57g is turned off in S89 and the program ends. On the other hand, when the variable k has not yet exceeded the value $S_{time}$ (no in S88), the program ends without turning off the smoothing flag 57g.

Hence, once the $S_{time}$ number of sets of smoothing correction characteristics S'(j), where $0 \leq j \leq S_{time}-1$ have been set, the corrected tone memory 57d is repeatedly updated at the successive smoothing setting times regardless of whether the application program 57b has outputted a print command. Accordingly, calibration of the corrected tone values is repeatedly performed until the actual printing characteristics R[i] match the ideal characteristics T[i].

With the personal computer 50 of the preferred embodiment, the number of smoothing times $S_{time}$ is set so that the number of modifications increases as the modification amount for the corrected tone values (corrected tone data) increases, and the corrected tone values are modified by dividing the modification amount by the number of smoothing times $S_{time}$ so that the actual printing characteristics R[i] approach the ideal characteristics T[i] in steps of the number of times $S_{time}$. It is possible to avoid an abrupt change in density level characteristics of printed colors before and after the corrected tone values are modified in each step. Specifically, density levels of printed colors will change considerably if the corrected tone values were modified to set the actual printing characteristics R[i] equal to the ideal characteristics T[i] through a single step. However, since the personal computer 50 of the present embodiment gradually changes the corrected tone values, the actual printing characteristics R[i] are gradually changed until the actual printing characteristics R[i] match the ideal characteristics T[i]. It is therefore possible to prevent undesirable printing results that occur when the printed colors change too abruptly.

Further, the personal computer 50 according to the present embodiment determines the number of smoothing times $S_{time}$, which is the number of modifications to be performed on the corrected tone values, based on the differences between the actual printing characteristics R[i] and the ideal characteristics T[i]. Therefore, it is possible to gradually change the actual printing characteristics R[i] to the ideal characteristics T[i] when the differences between the actual printing characteristics R[i] and the ideal characteristics T[i] are greater than the reference value and therefore the corrected tone values have to be modified by a too large amount in order to match the two. It is possible to prevent an unpleasant printed appearance caused by printed density levels changing too abruptly.

Further, the personal computer 50 according to the present embodiment modifies the corrected tone values in steps at the predetermined time intervals, such as every 30 minutes, thereby preventing the corrected tone values from being modified several times while printing a single document. If colors change several times during the printing of a single document on recording papers, the document can be perceived as lacking color stability, even when the amount of each change is small. Therefore, the personal computer 50 of the present embodiment does not modify the corrected tone values more than once during the predetermined time interval.

Further, the personal computer 50 according to the present embodiment sets the number of smoothing times $S_{time}$ based on the largest difference among the differences between the actual printing characteristics R[i] and the ideal characteristics T[i] for all the input levels i of 0 to 255. It is therefore possible to set the number of smoothing times $S_{time}$ to an optimal value.

Further, the personal computer 50 according to the present embodiment sets the number of smoothing times $S_{time}$ based on the largest difference among the differences between the ideal characteristics T[i] and the actual printing characteristics R[i] for all the four colors of C, M, Y, and K. By modifying the corrected tone values using the same number of smoothing times $S_{time}$ for all the colors, even when the actual printing characteristics R[i] differ among the CMYK colors, it is possible to maintain the balance of color tones in the printed image.

While the invention has been described in detail with reference to the specific embodiment thereof, it would be apparent to those skilled in the art that various changes and modifications may be made therein without departing from the spirit of the invention.

For example, in the embodiment described above, the corrected tone memory 57*d* is updated by the smoothing correction characteristics S' every time when the predetermined time interval, such as every 30 minutes (S15, S16), has elapsed after the corrected tone memory 57*d* had been updated. However, the corrected tone memory 57*d* may also be updated every time when papers with a predetermined printing amount unit have been printed after the corrected tone memory 57*d* had been updated.

Figure 11A:
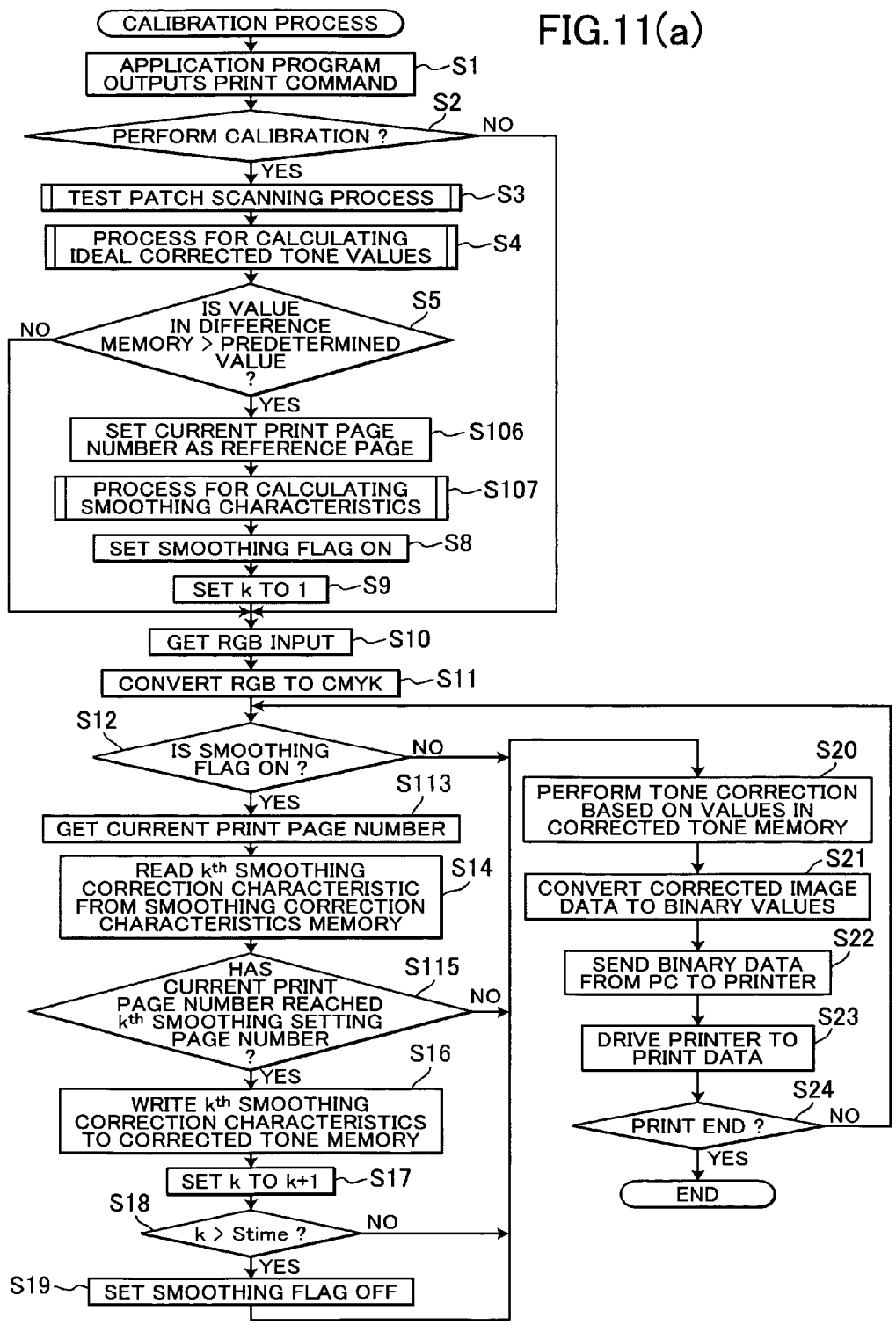
FIG. 11(a) is a flowchart showing a variation of the calibration process shown in FIG. 5(a)
Figure 11D:
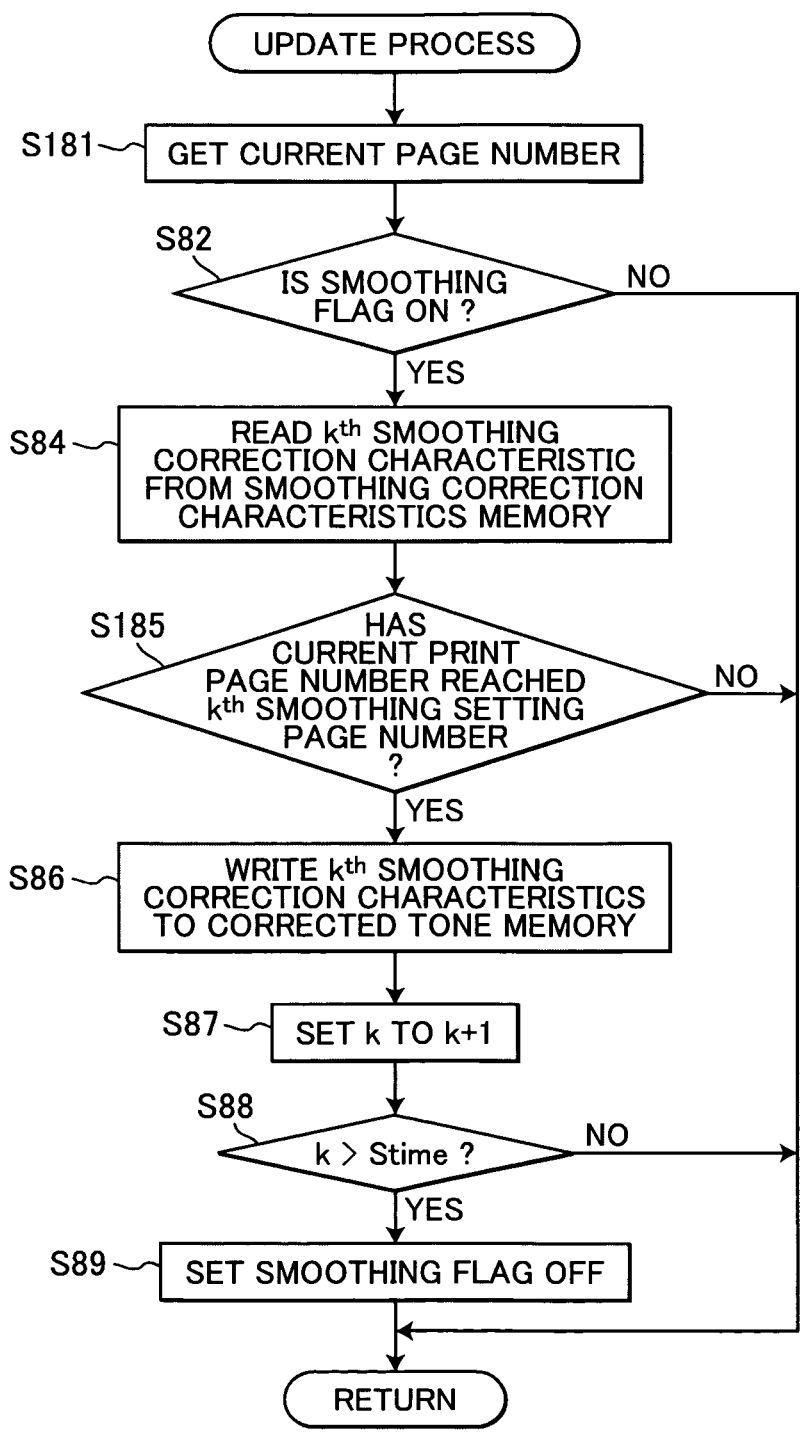
FIG. 11(d) is a flowchart showing a variation of the update process shown in FIG. 5(b).

FIGS. 11(*a*) shows a variation of the calibration process shown in FIG. 5(*a*). Common steps in the two calibration processes are designated with the same numbers to avoid duplicating description.

In the variation of FIG. 11(*a*), the CPU 51 performs a process in S106 (FIG. 11(*a*)), in place of S6 in FIG. 5(*a*), to store the current print page number as a reference page. The print page number is obtained, for example, from a counter (not shown) that stores the number of pages that have been printed from when the printer 1 had been shipped from the factory. The page number at the time when the process of S106 is executed (1234 pages, for example) is set as a reference.

Then, the CPU 51 executes the process of S107 as shown in FIG. 11(*b*). The process of S107 is the same as the process of S7 in the above-described embodiment shown in FIG. 8 except for the points described below.

More specifically, in place of S74, the CPU 51 executes a process in S174 to set, as smoothing setting page numbers, successive page numbers that are shifted from one another at predetermined printing amount units, such as every 100 pages (1334, 1434, 1534, . . . ). In place of S75, the CPU 51 executes a process in S175 to store the successive page numbers in the smoothing correction characteristics memory 57*f* in association with the smoothing correction characteristics S' as shown in FIG. 11(*c*).

In place of S13 in FIG. 5(*a*), the CPU 51 performs a process in S113 to obtain the current print page number from the counter. In place of S15 in FIG. 5(*a*), in S115 the CPU 51 determines whether the acquired print page number has reached the smoothing setting page number for the smoothing type No. k.

According to this variation, the update process of FIG. 5(*b*) is modified as shown in FIG. 11(*d*). Common steps in the two update processes are designated with the same numbers to avoid duplicating description.

As shown in FIG. 11(*d*), in place of S81 in FIG. 5(*b*), the CPU 51 performs a process in S181 to obtain the current print page number from the counter. In place of S85, in S185 the CPU 51 determines whether the acquired print page number has reached the smoothing setting page number for the smoothing type No. k.

In this way, according to this variation, when a predetermined printing amount has been printed after the corrected tone values have been modified, the corrected tone values are further modified.

According to the present variation, the corrected tone values are modified in steps at the predetermined printing amount unit (every 100 pages, for example) that is more than or equal to one page. It is therefore possible to prevent the corrected tone values from being modified while printing a page. In other words, the present variation modifies the corrected tone values in steps to reduce the amount of color change caused by the modification at each step. Since color changes occurring at several times while printing a single page will be perceived as a lack in color stability, even when the amount of change at each step is small, the present variation modifies the corrected tone values at regular intervals determined based on the predetermined printing amount unit.

The predetermined printing amount unit is preferably an even page number. This ensures that when printing two facing pages in a spread, the density levels on the left and right pages will be the same with each other.

Further, while the printer 1 in the above-described embodiment is a laser printer, the printer 1 may also be an inkjet type printer.

Further, the series of steps indicated in the flowcharts of FIG. 5(*a*)-FIG. 8 in the above-described embodiment are performed according to the calibration program 57*a* stored on the hard disk device 57 in the personal computer 50. However, a program for executing these image processes may be stored on the ROM 52 or flexible disk used in the personal computer 50, an optical disk, a magneto-optic disk, a CD-ROM, a magnetic tape, or a nonvolatile memory card. A program for executing these image processes may also be stored on the ROM 12 of the printer 1. In this case, the printer 1 may execute the series of steps indicated in the flowcharts of FIG. 5(*a*)-FIG. 8.

What is claimed is:

1. An image processing method, comprising:
   determining a set of output characteristics indicative of a correspondence between a plurality of corrected input levels and a plurality of output levels by printing patches based on a part of the corrected input levels, by measuring density levels of the printed patches, and by setting the measured density levels as the output levels;
   calculating a set of actual printing characteristics, based on the output characteristics and based on a set of tone correction characteristics, the tone correction characteristics being indicative of a plurality of input levels and the plurality of corrected input levels, the actual printing characteristics being indicative of a correspondence between the plurality of input levels and a plurality of actual density levels that are to be actually obtained when the plurality of input levels are corrected based on the tone correction characteristics and are printed based on the output characteristics;

determining an actual-target difference based on a difference between the actual printing characteristics and a set of predetermined target printing characteristics, the predetermined target printing characteristic being indicative of a correspondence between the plurality of input levels and a plurality of target density levels;

determining a set of target tone correction characteristics based on the target printing characteristics and the output characteristics, the target tone correction characteristics indicating a correspondence between the plurality of input levels and a plurality of target corrected input levels, the target tone correction characteristics being determined so as to allow the output characteristics to attain the target printing characteristics;

comparing the actual-target difference with a predetermined reference value; and performing a directly modifying process when the actual-target difference is smaller than or equal to the predetermined reference value, and performing a smoothly modifying process when the actual-target difference is greater than the predetermined reference value;

the directly modifying process updating the set of tone correction characteristics directly to the set of target tone correction characteristics by modifying the corrected input levels in the set of tone correction characteristics to the target corrected input levels in the set of target tone correction characteristics in one step, to cause resultant printing characteristics to change directly from the calculated actual printing characteristics to the target printing characteristics, the smoothly modifying process including:
  determining a number of modification steps by dividing the actual-target difference by a predetermined amount, the number of modification steps being greater than one;
  determining a plurality of sets of smoothing printing characteristics, the number of the plurality of sets of smoothing printing characteristics being equal to the number of modification steps, the plurality of sets of smoothing printing characteristics being made up from first through last sets of smoothing printing characteristics, the last set of smoothing printing characteristics being equal to the set of target printing characteristics, each set of smoothing printing characteristics indicating a correspondence between the plurality of input levels and a plurality of density levels, the density level for each input level in each set of smoothing printing characteristics having a value dependent on a value determined by dividing a difference between the actual density level and the target density level for the each input level by the number of modification steps, differences among the actual printing characteristics and the smoothing printing characteristics being equal to a value that is determined by dividing the actual-target difference by the number of modification steps;
  determining a plurality of sets of smoothing tone correction characteristics based on the plurality of sets of smoothing printing characteristics, the plurality of sets of smoothing tone correction characteristics being made up from first through last sets of smoothing tone correction characteristics, the last set of smoothing tone correction characteristics being equal to the set of target tone correction characteristics, each set of smoothing tone correction characteristics indicating a correspondence between the plurality of input levels and a plurality of smoothly-modified, corrected input levels, each set of smoothing tone correction characteristics being determined so as to allow the output characteristics to attain the corresponding set of smoothing printing characteristics; and
  updating the set of tone correction characteristics into the first through last sets of smoothing tone correction characteristics one set by one set in this order,
  wherein the set of tone correction characteristics is updated in steps of the number of modification steps by successively modifying the corrected input levels in the tone correction characteristics in steps of the number of modification steps so that the corrected input levels are changed into the smoothly-modified, corrected input levels in the first through last sets of smoothing tone correction characteristics in this order, to cause resultant printing characteristics to change gradually from the calculated actual printing characteristics to the target printing characteristics, and
  wherein the smoothly modifying process further comprises receiving instruction to process image data and performing a tone correction process to convert the image data into tone-corrected image data based on most-recently-updated tone correction characteristics and outputting the tone-corrected image data.

2. An image processing method according to claim 1, wherein the smoothly modifying process further includes:
  determining a plurality of modification timings, at which modifications are to be executed, the number of the plurality of modification timings being equal to the number of modification steps; and
  associating the plurality of sets of smoothing tone correction characteristics in one to one correspondence with the plurality of modification timings; and
  judging whether or not one of the modification timings has reached; and
  wherein when one of the modification timings has reached, the tone correction characteristics is updated.

3. An image processing method according to claim 1, wherein when a predetermined printing amount has been printed after the tone correction characteristics has been updated in a modification step other than a last modification step, the updated tone correction characteristics is further updated in the next modification step.

4. An image processing method according to claim 1, wherein when a predetermined period of time has passed after the tone correction characteristics has been updated in a modification step other than a last modification step, the updated tone correction characteristics is further updated in the next modification step.

5. An image processing method according to claim 1, wherein the actual-target difference determining step determines the actual-target difference based on a maximum difference among the differences between the actual density levels in the calculated actual printing characteristics and the target density levels in the target printing characteristics for all the input levels.

6. An image processing method according to claim 1, wherein:
the calculating step calculates the actual printing characteristics for each of a plurality of colors; and
the actual-target difference determining step determines the actual-target difference based on a maximum difference among differences between the target printing characteristics and the calculated actual printing characteristics for all the plurality of colors.

7. An image processing method according to claim 1, wherein the plurality of sets of smoothing printing characteristics are determined to allow difference, for each input level, among the actual density level and the density levels in the plurality of sets of smoothing printing characteristics to be equal to an amount that is obtained by dividing the difference between the actual density level and the target density level for the each input level by the number of modification steps.

8. An image processing method according to claim 7, the smoothly modifying process further including:
determining a plurality of modification timings, at which modifications are to be executed, the number of the plurality of modification timings being equal to the number of modification steps;
associating the plurality of sets of smoothing tone correction characteristics in one to one correspondence with the plurality of modification timings; and
judging whether or not one of the plurality of modification timings has reached;
wherein when one of the plurality of modification timings has reached, the set of tone correction characteristics is updated.

9. An image processing method according to claim 8, wherein:
the plurality of modification timings are defined as a plurality of different scheduled times; and
judging whether or not one of the plurality of modification timings has reached includes:
measuring time; and
judging whether or not the measured time reaches one of the plurality of scheduled times.

10. An image processing method according to claim 8, wherein:
the plurality of modification timings are defined as a plurality of different page numbers; and
judging whether or not one of the plurality of modification timings has reached includes:
counting a number of pages that have been printed; and
judging whether or not the counted number of pages reaches one of the plurality of page number.

11. An image processing method according to claim 3, wherein the predetermined printing amount is at least one page's worth of an amount, thereby preventing the tone correction characteristics from being updated while one page is being printed.

12. An image processing method according to claim 2, wherein the smoothly modifying process further includes judging, after receiving the instruction, whether or not one of the modification timings has reached, and
wherein if it is determined that one of the modification timings has reached, the tone correction characteristics is updated, and the tone correction process is started being executed based on the newly-updated tone correction characteristics.

13. An image processing system, comprising:
a printer configured to print an image on a sheet and to print color patches;
an image processing device, the image processing device comprising:
a processor;
a colorimeter configured to measure density levels of the color patches;
a storage unit including:
a colorimetric value memory configured to store the density levels of the color patches measured by the colorimeter;
an actual printer characteristics memory configured to store actual printer characteristics of the printer;
an ideal characteristics memory configured to store predetermined ideal printer characteristics of the printer;
a difference memory configured to store difference between the ideal printer characteristics and the actual printer characteristics;
a corrected tone memory configured to store a set of corrected tone values;
a smoothing correction characteristics memory configured to store a plurality of sets of smoothing corrected tone values;
a memory configured to store machine executable instructions, the machine executable instructions being configured, when being executed by the processor, to cause the image processing device to perform:
printing the color patches by the printer based on part of the set of corrected tone values stored in the corrected tone memory;
measuring the density levels of the color patches by the colorimeter, and storing the density levels of the color patches in the colorimetric value memory;
calculating the actual printer characteristics based on the density levels of the color patches, the actual printer characteristics corresponding to the set of corrected tone values stored in the corrected tone memory;
calculating a set of target corrected tone values based on the density levels of the color patches and the ideal printer characteristics;
calculating difference between the ideal printer characteristics and the actual printer characteristics, and storing the difference in the difference memory;
comparing the difference with a predetermined reference value;
if the difference is less than or equal to the predetermined reference value, updating the set of corrected tone values stored in the corrected tone memory directly to the set of target corrected tone values;
if the difference is greater than the predetermined reference value, calculating a number of modification steps dependently on the difference, calculating the plurality of sets of smoothing corrected tone values by dividing the difference by the number of modification steps, the plurality of sets of smoothing corrected tone values being made up from first through last sets of smoothing corrected tone values, the number of the first through last sets of smoothing corrected tone values being equal to the number of modification steps, the last set of smoothing corrected tone values being equal to the set of target corrected tone values, and updating the set of corrected tone values stored in the corrected tone memory into the first through last sets of smoothing corrected tone values one set by one set in this order by a predetermined interval;
receiving an instruction to form an image on a sheet based on image data; and
in response to the instruction, correcting the image data by using a set of corrected tone values that has been most recently updated in the corrected tone memory and forming an image on the sheet based on the corrected image data by the printer.

14. The image processing system as claimed in claim 13, wherein the predetermined interval is defined by a predetermined time interval.

15. The image processing system as claimed in claim 13, wherein the predetermined interval is defined by a predetermined number of pages printed by the printer.

16. The image processing system as claimed in claim 13, further comprising judging, after receiving the instruction, whether or not a modification timing, at which the set of corrected tone values that is presently being stored in the corrected tone memory should be updated into the next set of corrected tone values, has reached, and wherein if it is determined that the modification timing has reached, the set of corrected tone values is updated, and the image data is started being corrected by using the newly-updated set of corrected tone values.

* * * * *